(12) United States Patent
Utzinger

(10) Patent No.: US 9,221,360 B2
(45) Date of Patent: Dec. 29, 2015

(54) LONGITUDINALLY ADJUSTABLE VEHICLE SEAT WITH A MEMORY DEVICE

(75) Inventor: Karl Utzinger, Weselberg (DE)

(73) Assignee: KEIPER GMBH & CO. KG, Kaiserslautern (DE)

( * ) Notice: Subject to any disclaimer, the term of this patent is extended or adjusted under 35 U.S.C. 154(b) by 135 days.

(21) Appl. No.: 14/116,063

(22) PCT Filed: May 3, 2012

(86) PCT No.: PCT/EP2012/058062
§ 371 (c)(1),
(2), (4) Date: Dec. 28, 2013

(87) PCT Pub. No.: WO2012/152634
PCT Pub. Date: Nov. 15, 2012

(65) Prior Publication Data
US 2015/0042140 A1   Feb. 12, 2015

(30) Foreign Application Priority Data
May 7, 2011   (DE) .......................... 10 2011 100 866

(51) Int. Cl.
*B60N 2/02*   (2006.01)
*B60N 2/12*   (2006.01)
*B60N 2/08*   (2006.01)
*B60N 2/22*   (2006.01)

(52) U.S. Cl.
CPC .............. *B60N 2/123* (2013.01); *B60N 2/0818* (2013.01); *B60N 2/0837* (2013.01); *B60N 2/0875* (2013.01); *B60N 2/22* (2013.01)

(58) Field of Classification Search
CPC ........ B60N 2/12; B60N 2/123; B60N 2/0818; B60N 2/0875; B60N 2/0837; B60N 2/22
See application file for complete search history.

(56) References Cited

U.S. PATENT DOCUMENTS

| | | | |
|---|---|---|---|
| 7,097,250 B2 * | 8/2006 | Rausch et al. | 297/341 |
| 7,172,249 B2 * | 2/2007 | Rausch et al. | 297/341 |
| 7,600,816 B2 * | 10/2009 | Bauersachs et al. | 297/341 |
| 7,926,875 B2 * | 4/2011 | Schmale | 297/344.11 |
| 8,191,850 B2 | 6/2012 | Wetzig et al. | |

(Continued)

FOREIGN PATENT DOCUMENTS

| | | |
|---|---|---|
| CN | 101959712 A | 1/2011 |
| DE | 101 27 152 A1 | 11/2002 |

(Continued)

OTHER PUBLICATIONS

First Official Action mailed Jan. 20, 2012, as received in corresponding German Patent Application No. 10 2011 100 866.0.

(Continued)

*Primary Examiner* — Philip Gabler
(74) *Attorney, Agent, or Firm* — Foley & Lardner LLP

(57) ABSTRACT

In a longitudinally adjustable vehicle seat with a freely pivotable backrest which can be folded forward and with a memory device, the memory device has a stop rail with latching openings, and a locking element with a slider and pall connected pivotably thereto and a ramp which is arranged on the slider and has an upper region, with which a scanner of the memory device interacts, wherein the scanner is connected to a transmission arrangement for locking the backrest in an entry position, and the pall is prestressed in the locking direction by a spring.

7 Claims, 26 Drawing Sheets

(56) References Cited

U.S. PATENT DOCUMENTS

Figure 1:
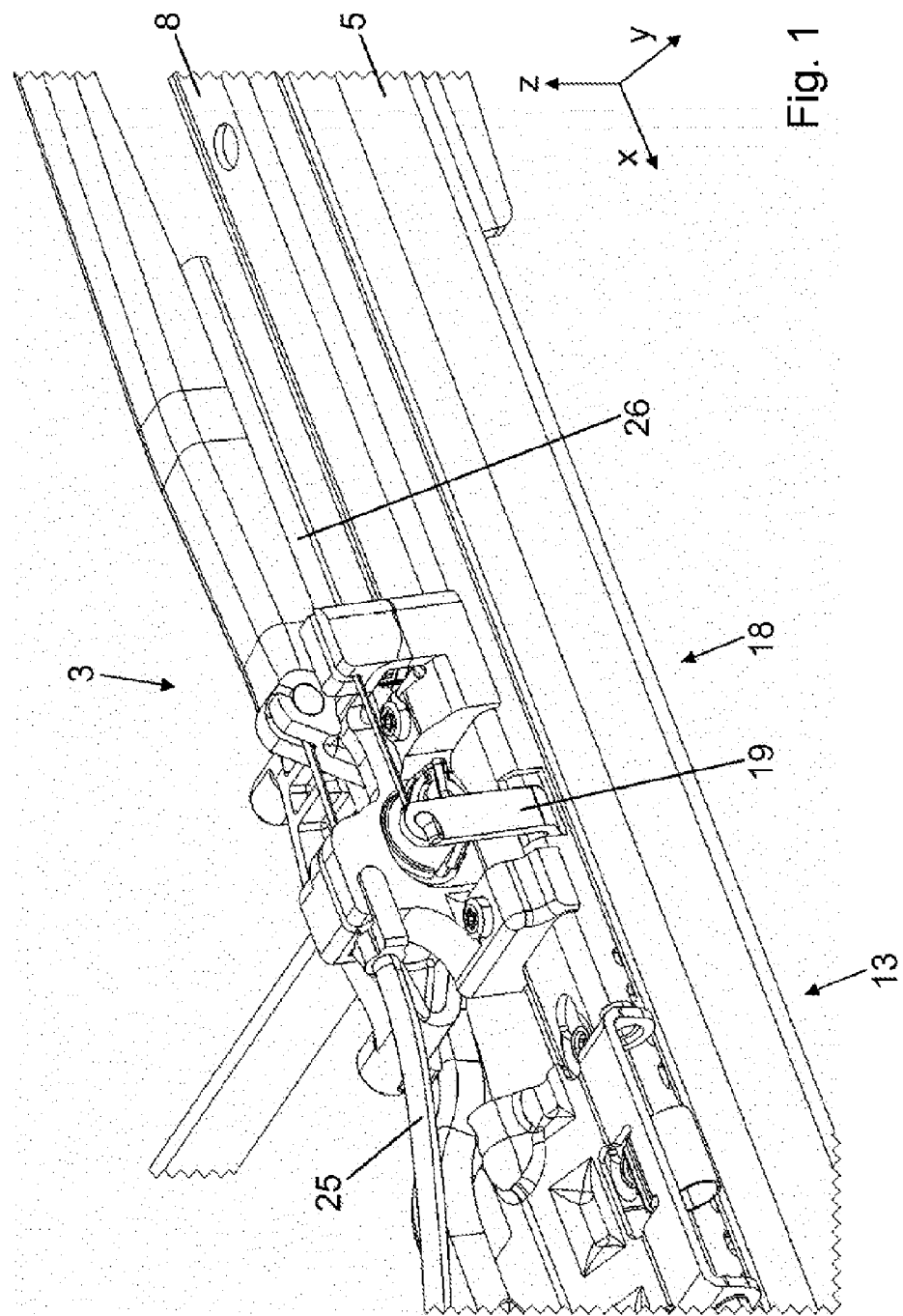

2004/0169409 A1    9/2004    Rausch et al.
2009/0058169 A1*   3/2009    Soga .......................... 297/463.1

FOREIGN PATENT DOCUMENTS

| | | |
|---|---|---|
| DE | 100 50 959 B4 | 11/2005 |
| DE | 202004 011 388 U1 | 11/2005 |
| DE | 102006 09 265 A1 | 8/2006 |
| DE | 102009 10 226 A1 | 8/2010 |
| EP | 1 390 226 A1 | 2/2004 |
| JP | 2004-526626 | 9/2004 |
| WO | WO-02/094604 A3 | 11/2002 |
| WO | WO-02/094605 A1 | 11/2002 |

OTHER PUBLICATIONS

International Search Report mailed Jul. 19, 2012, as received in corresponding International Patent Application No. PCT/EP2012/058062.
Office Action in corresponding Japanese Application No. 2014-509671 dated Nov. 18, 2014, 2 pages.
Office Action in corresponding Korean Application No. 10-2013-7032368 dated Jan. 5, 2015 and English translation, 8 pages.
Office Action dated Apr. 23, 2015 received in corresponding Chinese application No. 201280022225.6, 6 pages.

* cited by examiner

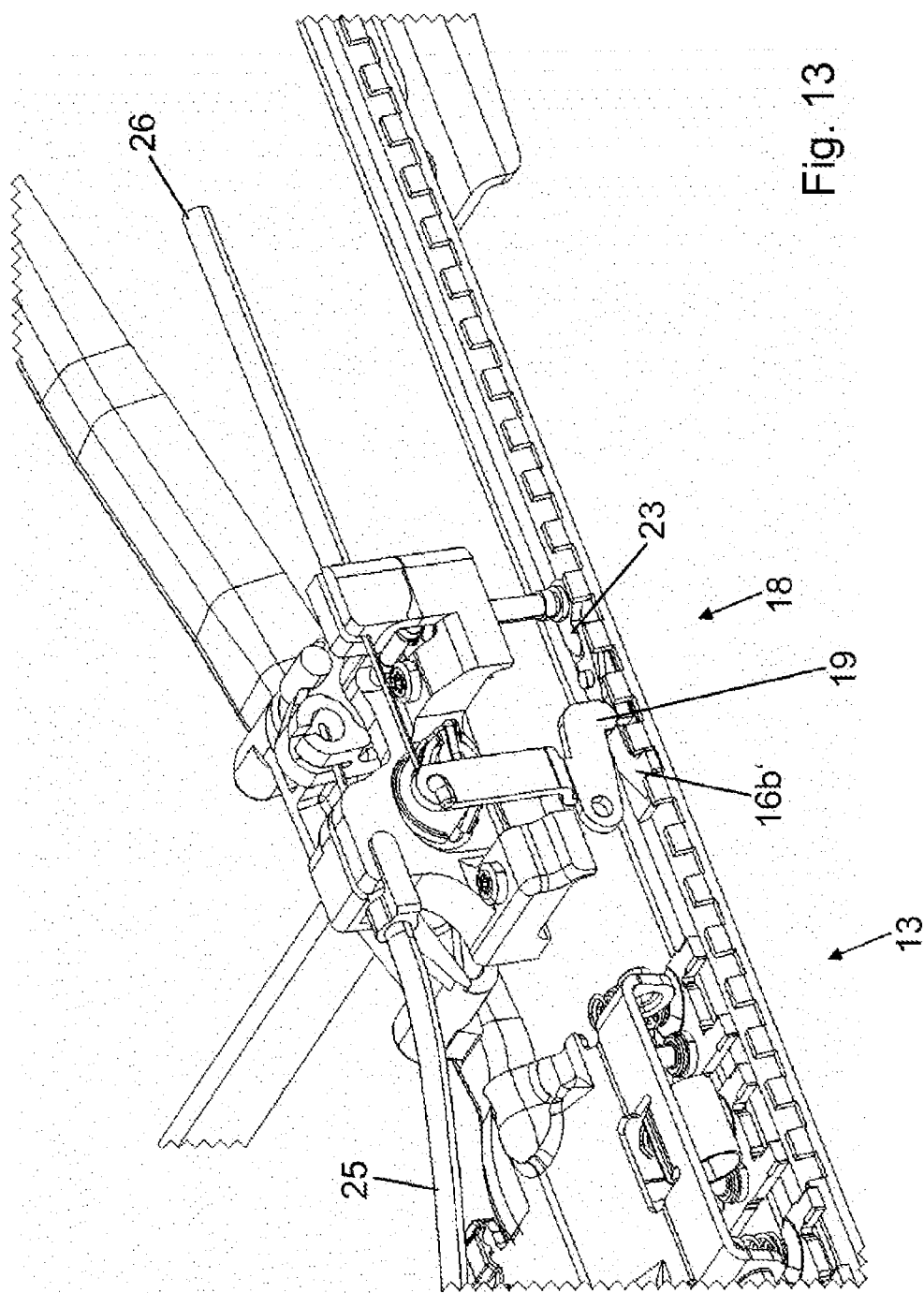

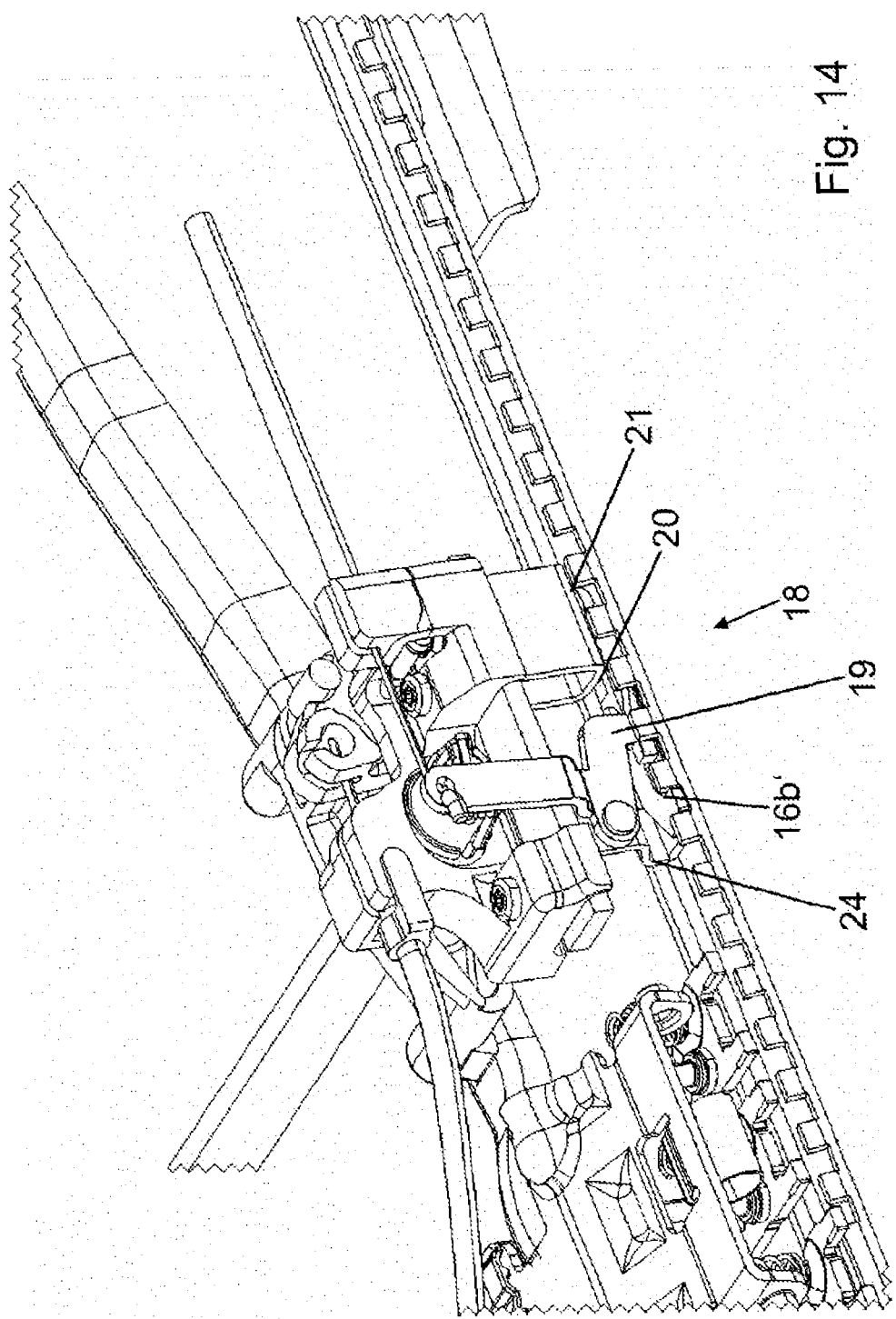

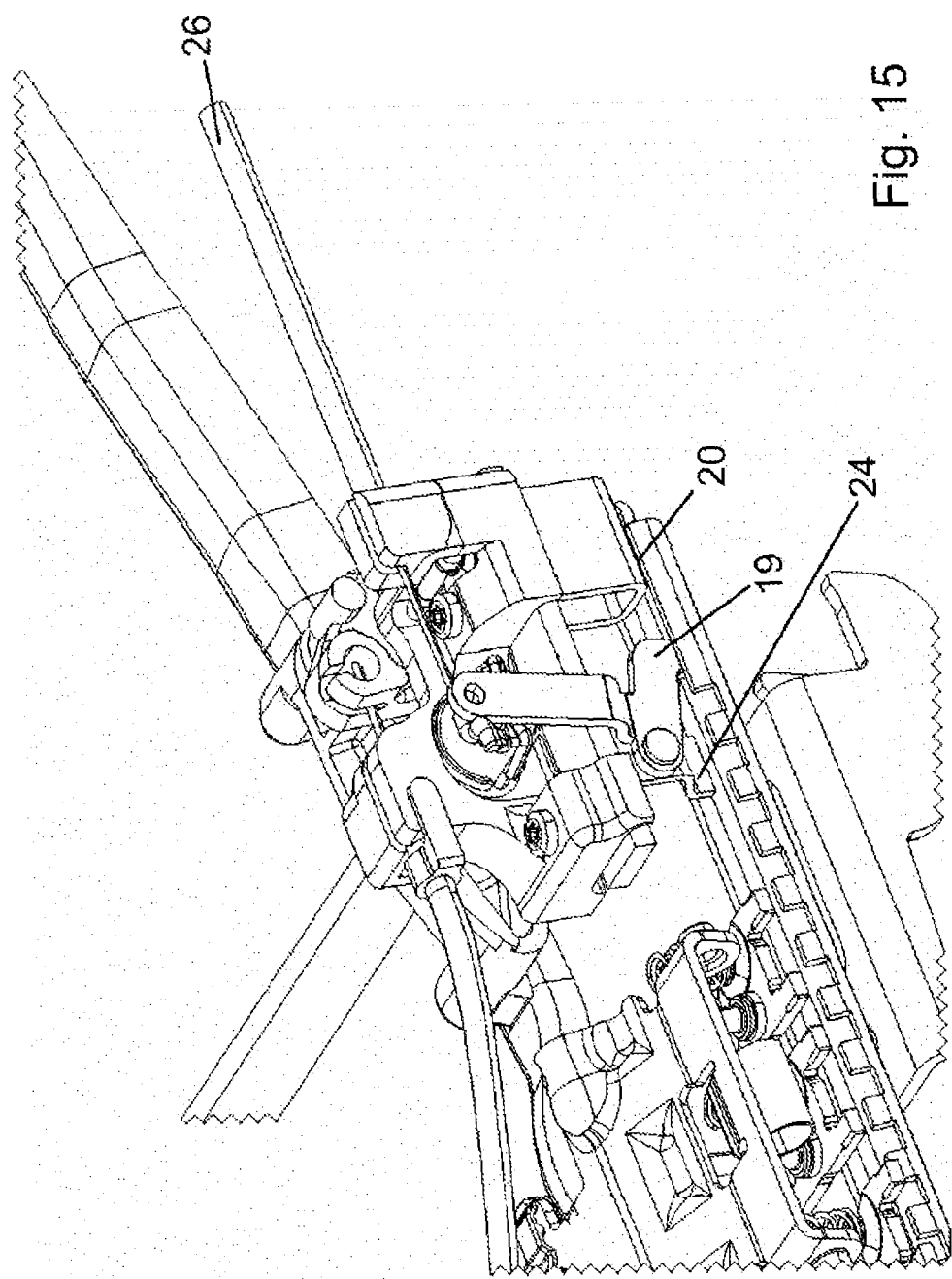

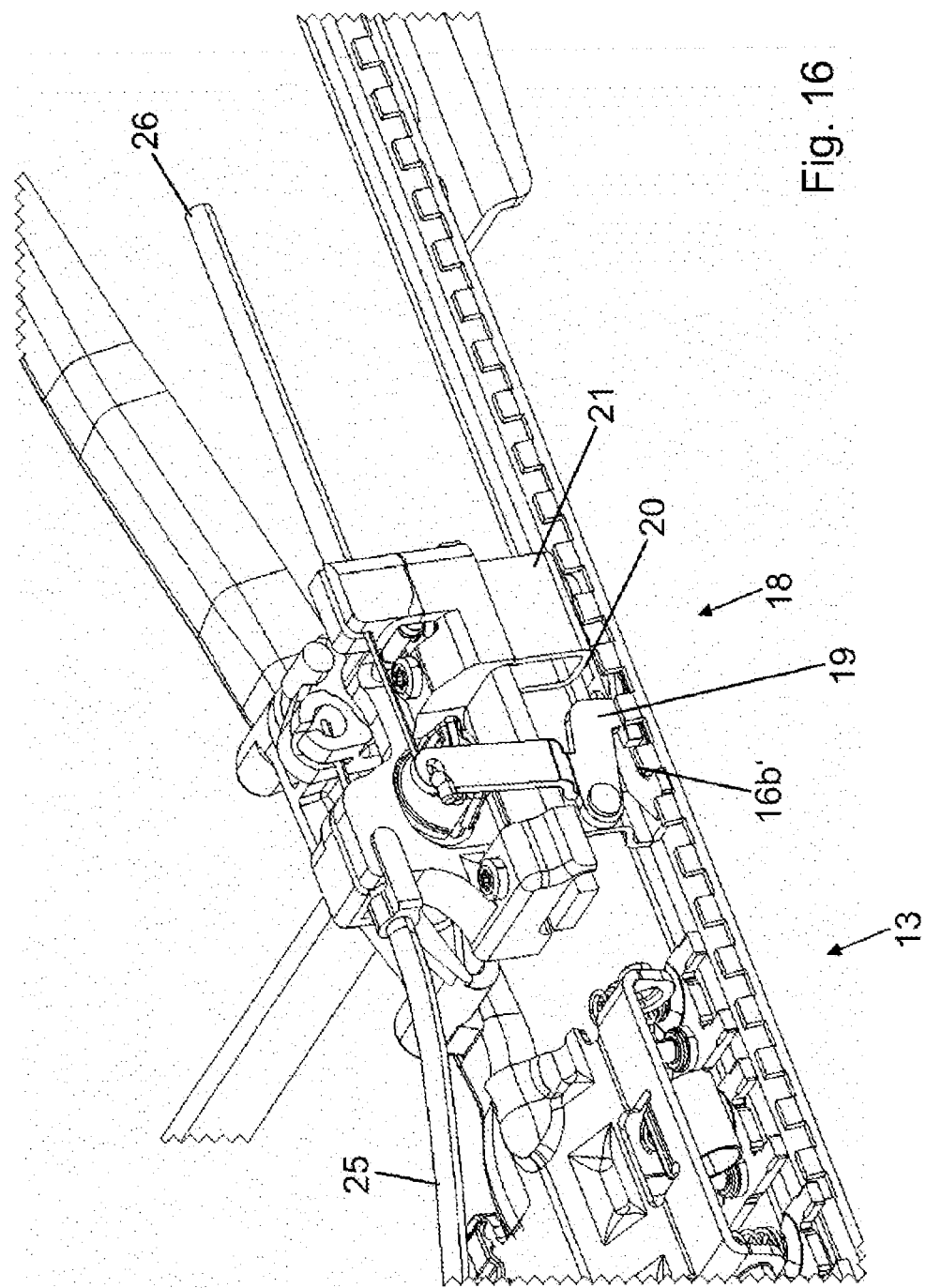

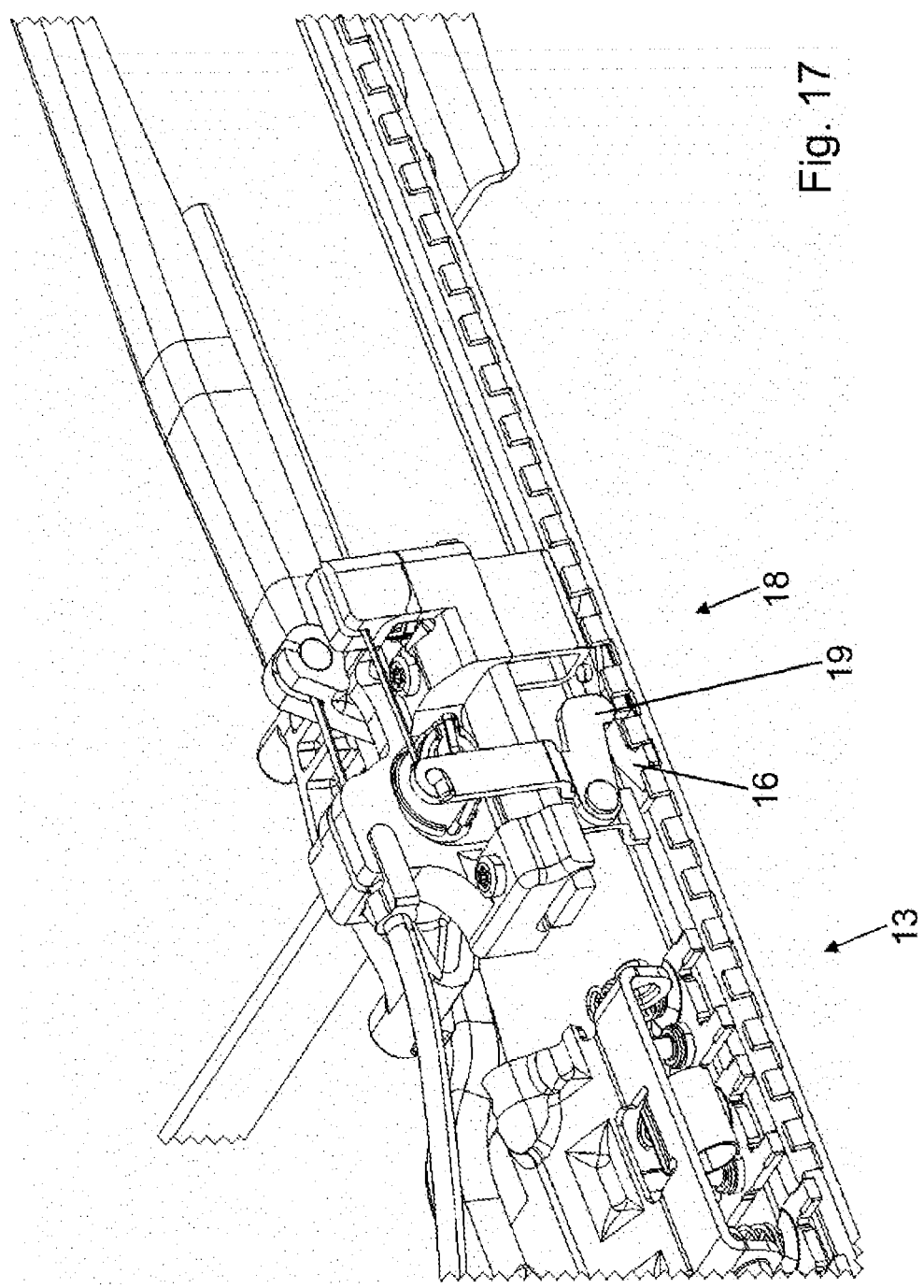

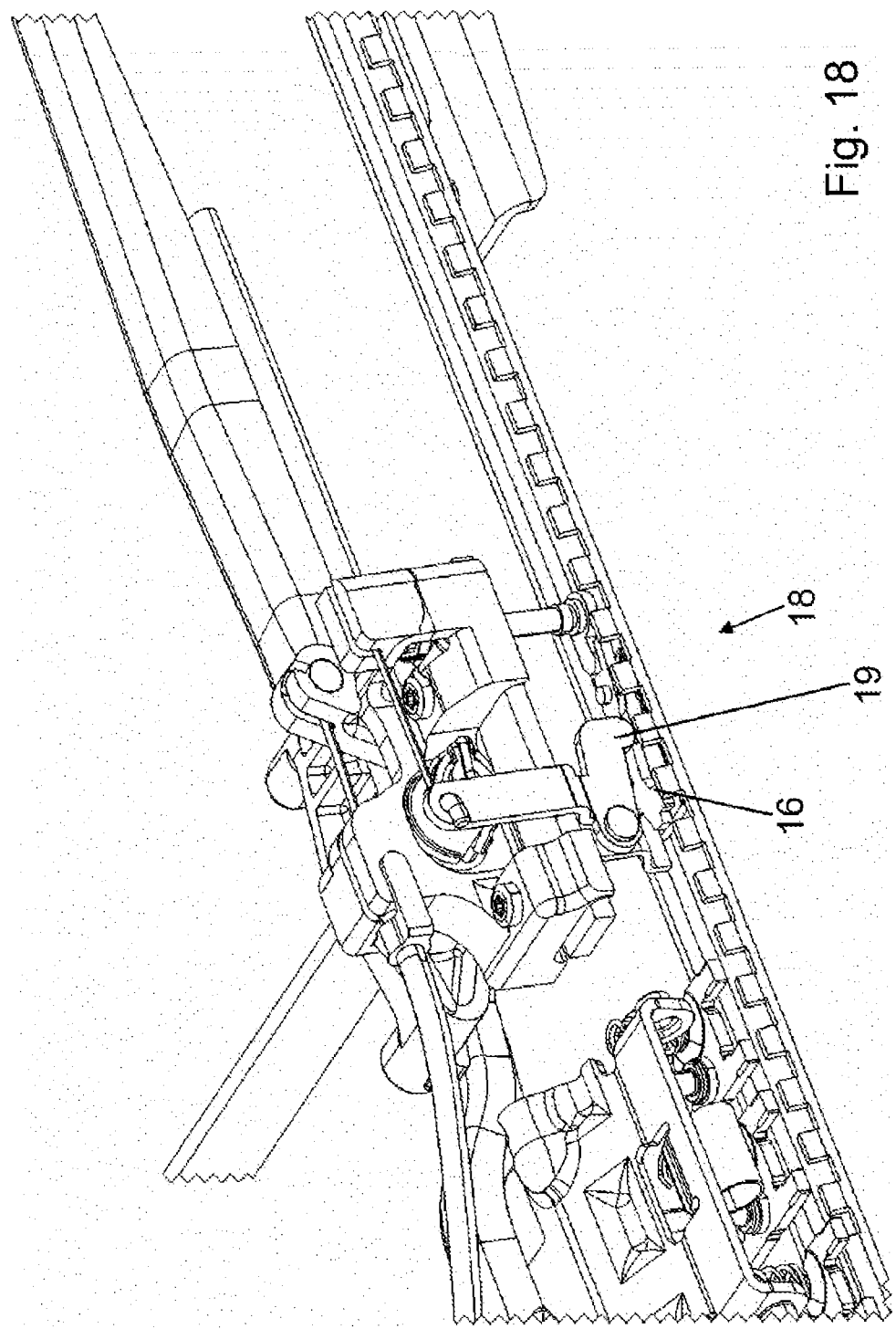

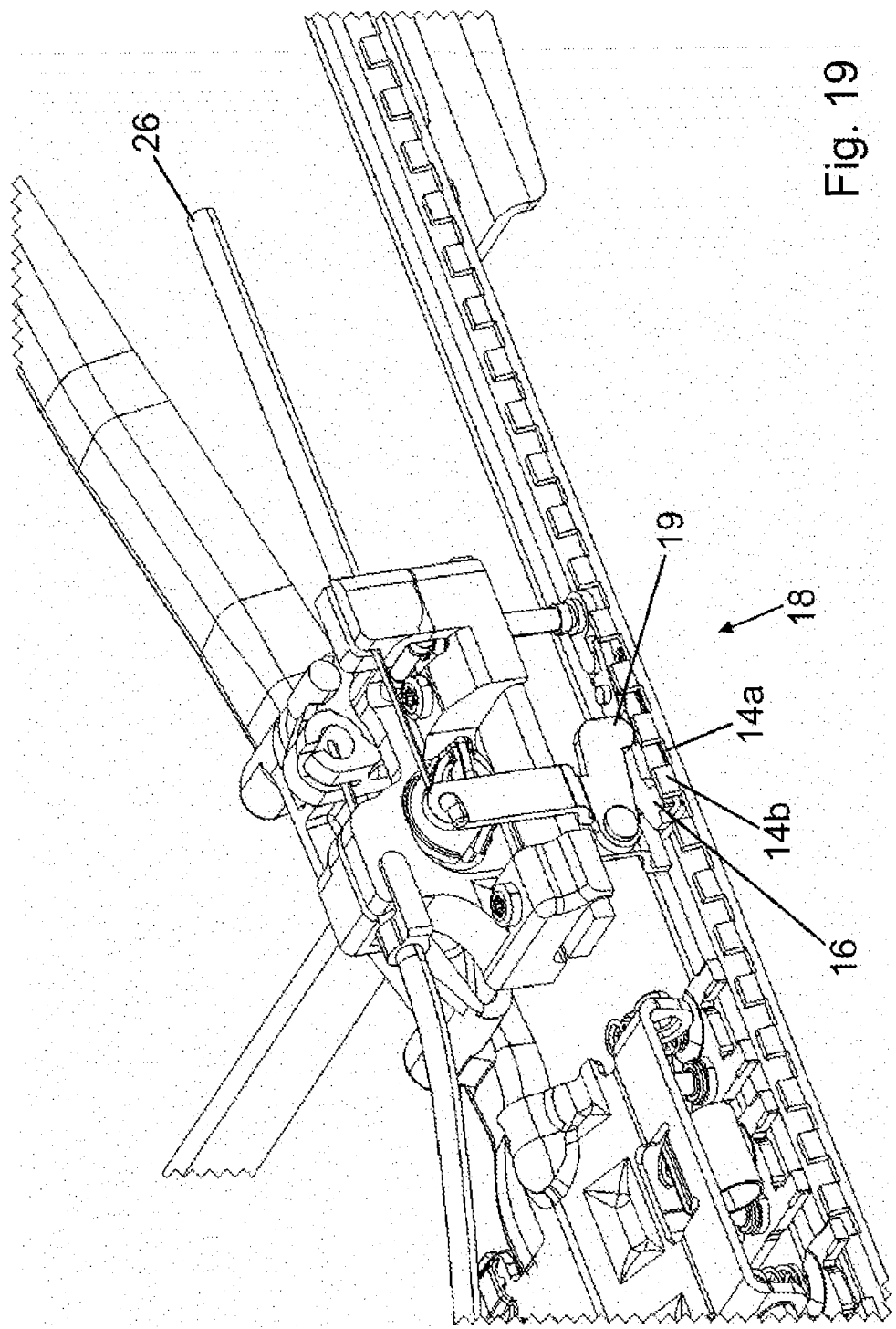

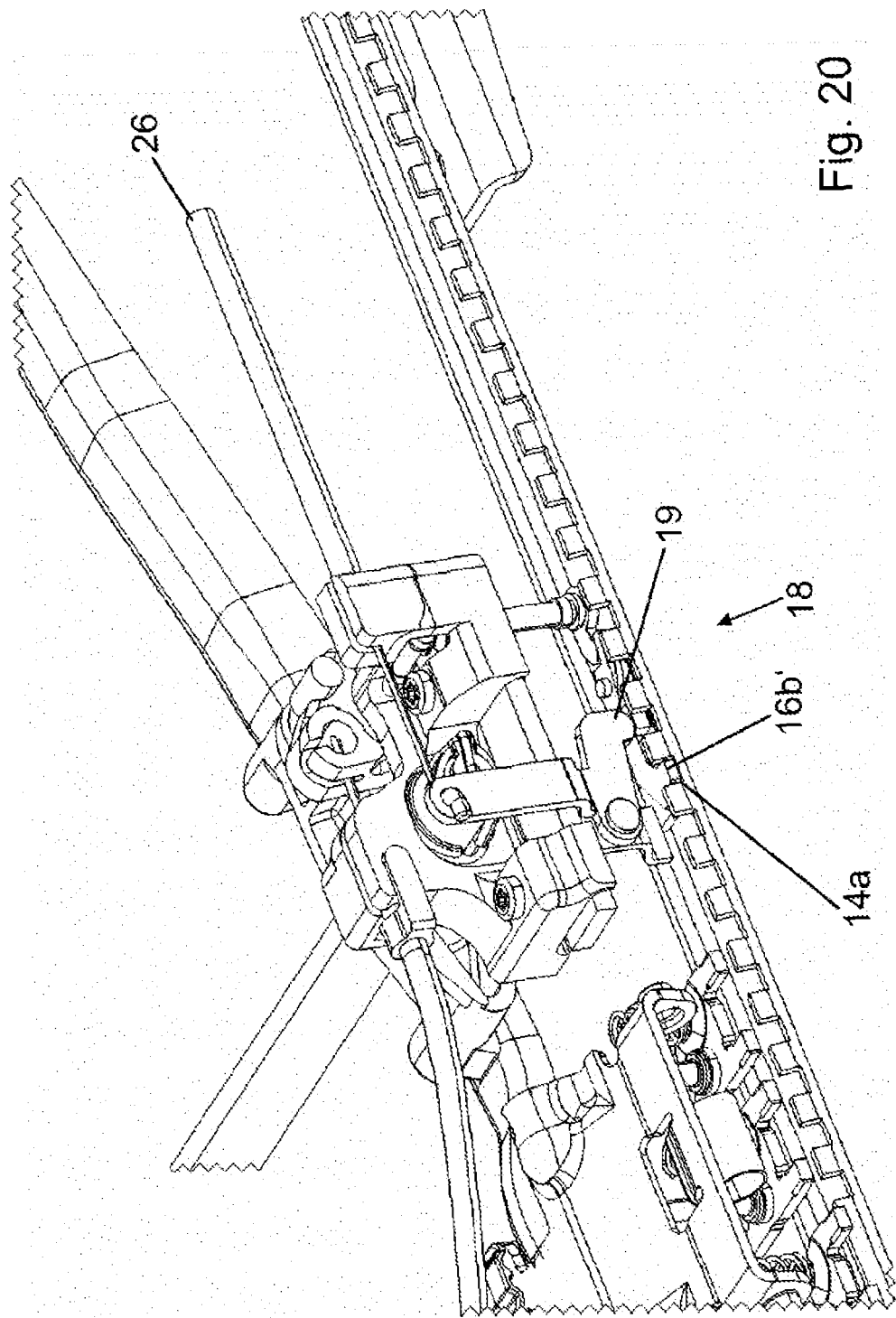

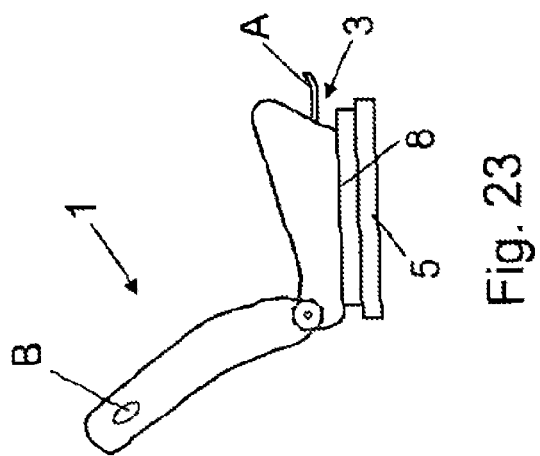
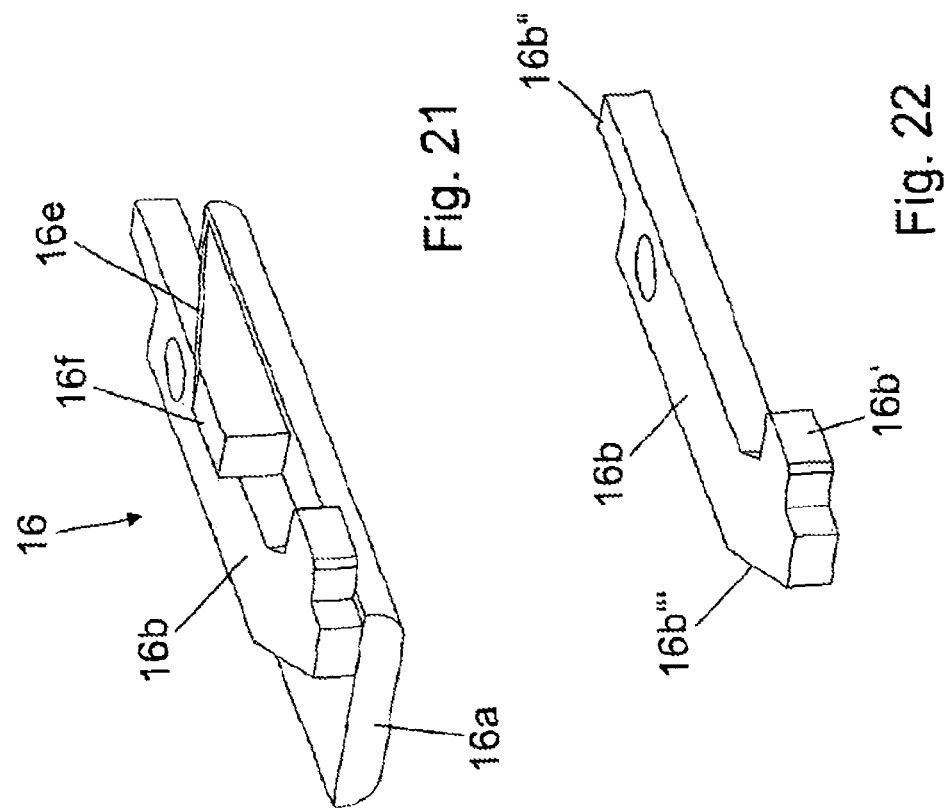

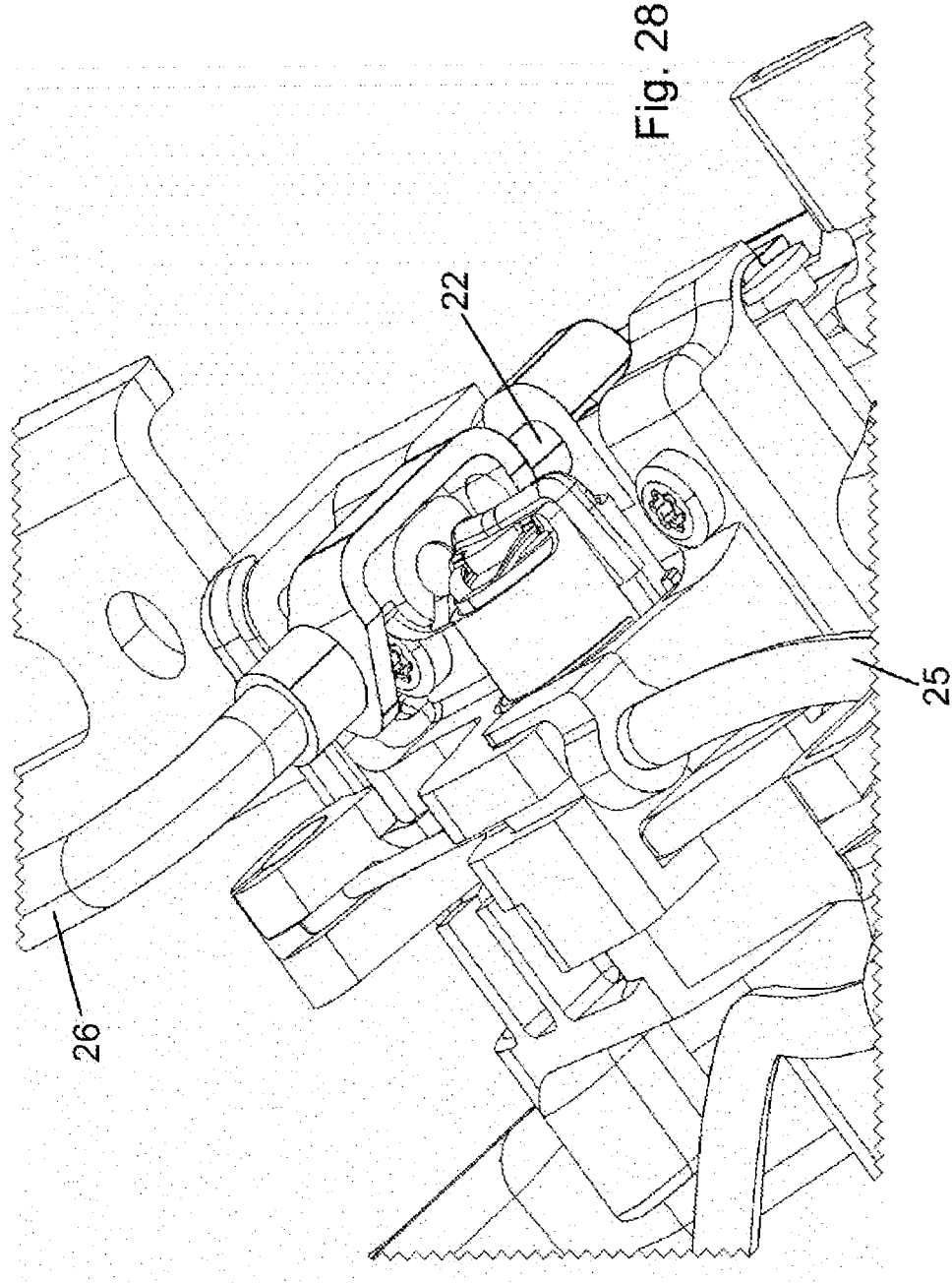

LONGITUDINALLY ADJUSTABLE VEHICLE SEAT WITH A MEMORY DEVICE

CROSS REFERENCE TO RELATED APPLICATIONS

The present application is a U.S. National Stage of International Application No. PCT/EP2012/058062, filed on May 3, 2012, which claims the benefit of German Patent Application No. 10 2011 100 866.0, filed on May 7, 2011, the entire disclosures of all of which are incorporated herein by reference.

DESCRIPTION

The invention relates to a longitudinally adjustable vehicle seat with a memory device having the features of the preamble of claim 1.

EP 1 390 226 B1 discloses a motor vehicle seat comprising a seat frame, a backrest which is pivotably mounted on the seat frame and which is able to be folded forward in an unlocked state from the position of use thereof in the direction of a seat surface of the seat frame, a longitudinal guide by which the seat frame is able to be moved for adjusting the longitudinal seat position in the longitudinal direction of the seat, a securing device for blocking the seat frame in a previously adjusted longitudinal seat position, a coupling mechanism which acts on the securing device and unlocks said securing device when the backrest is folded forward in the direction of the seat surface so that the seat frame is able to be displaced with the backrest folded forward in the longitudinal direction of the seat, and a memory device by means of which the seat frame is able to be held automatically in an adjustable longitudinal seat position defined as the memory position when moved in the longitudinal direction of the seat. In this case, an actuating mechanism is provided on a rail of the longitudinal guide which bears the seat frame and is movable together with said seat frame in the longitudinal direction of the rail, said actuating mechanism being operatively connected to a backrest unlocking device for the folded-forward backrest, and which when the memory position of the seat frame is reached actuates the backrest unlocking device so that the backrest is able to be folded into a position of use. Moreover, the actuating mechanism has a trigger element which when the memory position is reached is operatively connected to the memory device and as a result triggers the actuating mechanism and which is connected to a traction means via a lever arrangement, said traction means being coupled to the backrest unlocking device. In this case, the actuating mechanism together with the lever arrangement are of relatively complicated configuration. The memory device comprises in this case a stop rail fixed to the lower rail with latching openings with which a locking pawl movably mounted on a slider cooperates. The locking pawl is configured in this case to be pivotable about a pivot axis extending in the y-direction, wherein a latching hook of the locking pawl is engaged in the stop rail in a substantially vertical direction. The locking of the memory device takes place by folding forward the backrest in the direction of the seat surface, wherein in this phase no further displacement of the vehicle seat is possible due to the locking of the securing device.

The object of the invention is to improve a vehicle seat having a memory device of the type mentioned in the introduction. This object is achieved according to the invention by a vehicle seat having the features of claim 1. Advantageous embodiments form the subject-matter of the sub-claims.

According to the invention, in this case a locking element is provided which has a ramp with an upper region arranged on the slider with which a scanner of the memory device cooperates, wherein the scanner is connected to the transmission arrangement. The transmission arrangement is in turn preferably connected to a comfort locking device of the backrest i.e. the backrest is locked in the folded-forward position to adopt the entry position.

Preferably the ramp is at an angle relative to the first seat rail of less than 45°, in particular a maximum of 30°, and has an upper region extending parallel to the first seat rail.

The activation of the unlocking of the locking device preferably takes place by folding forward the backrest and activating the locking of the backrest in the folded-forward position, after a forward displacement movement of the vehicle seat.

In particular, the backrest is locked in the folded-forward position whilst the scanner slides down over the ramp, at the latest immediately when leaving the ramp.

The unlocking of the backrest preferably takes place in the folded-forward position after the scanner has reached the ramp and whilst the scanner slides up along the ramp, but at the latest when the upper region of the ramp is reached.

Particularly preferably, the locking element is normally in a locked position and is unlocked with a longitudinal adjustment of the vehicle seat and is entrained via stops, wherein the scanner remains in abutment against the upper region of the ramp during a longitudinal adjustment of the vehicle seat.

In a particularly preferred manner, the scanner provides a direct 1:1 transmission of pressure to the locking device of the backrest in the entry position.

Preferably, the locking pawl is pivotably attached to the slider about a vertical pivot axis and, for storing the memory position, cooperates with latching openings laterally arranged on the stop rail. This permits a very low overall height.

The locking element preferably has a stop protruding in the vertical direction and which is formed by the pivot axis of the locking pawl.

A vehicle seat with a corresponding memory device may be used, for example, in a passenger motor vehicle or a utility vehicle, wherein it does not necessarily have to be a driver's seat. Such a vehicle seat is preferably provided in a front seat row but may also be provided in a central seat row or rear seat row, for example even in a van.

Figure 2:
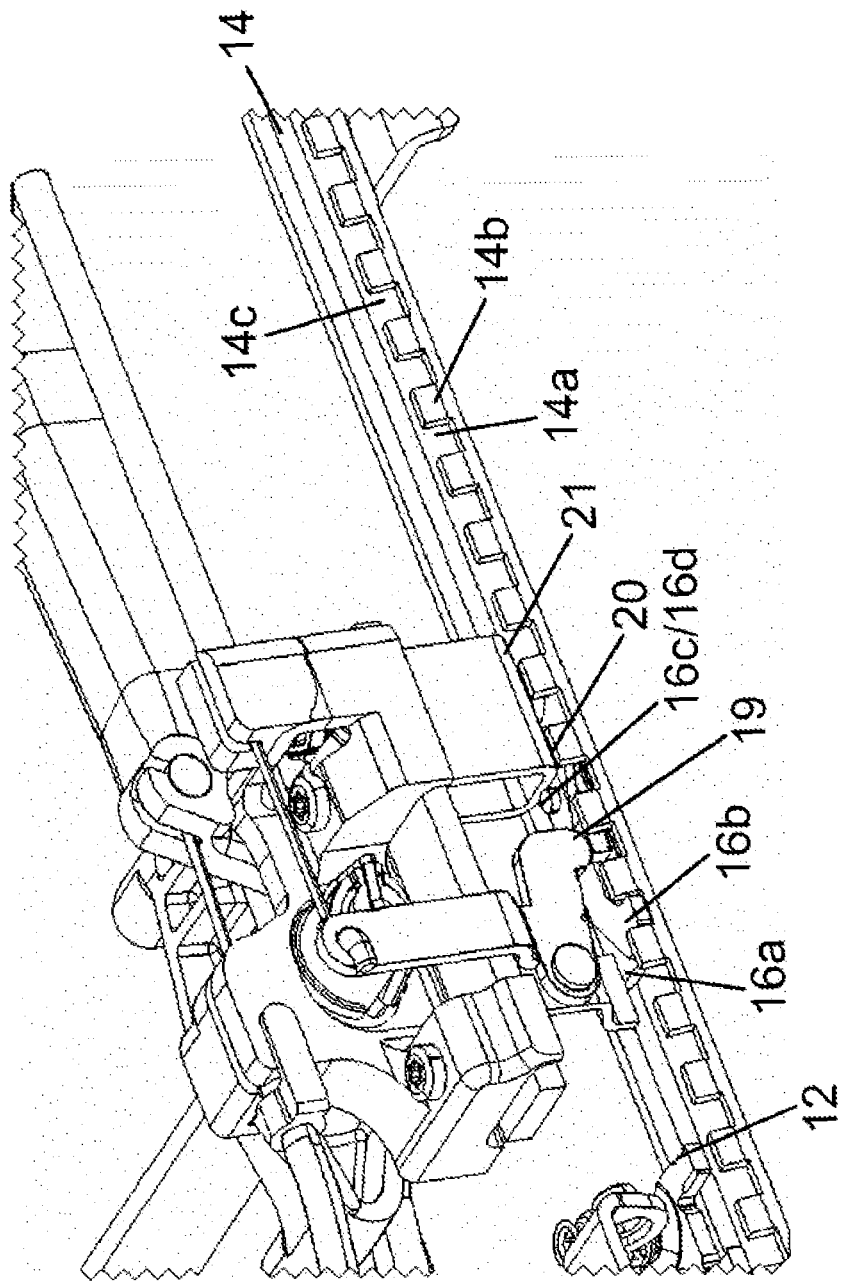
Figure 3:
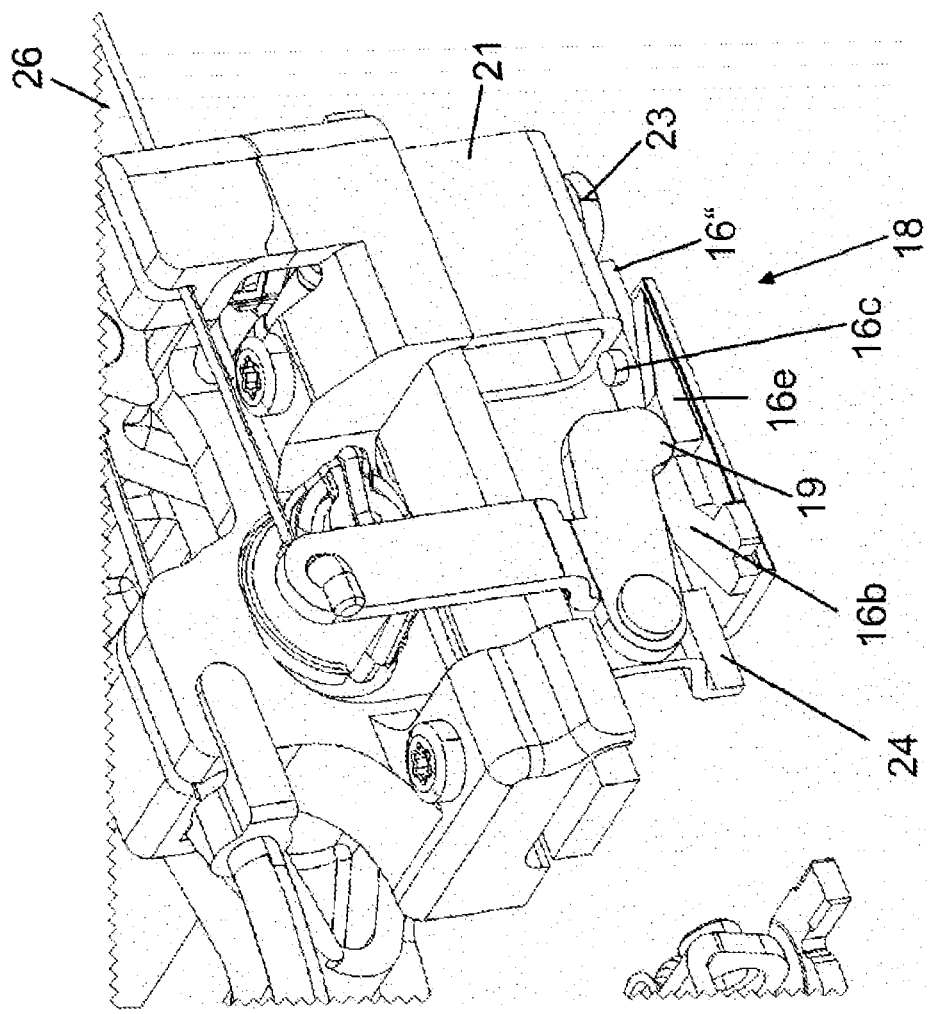
Figure 4:
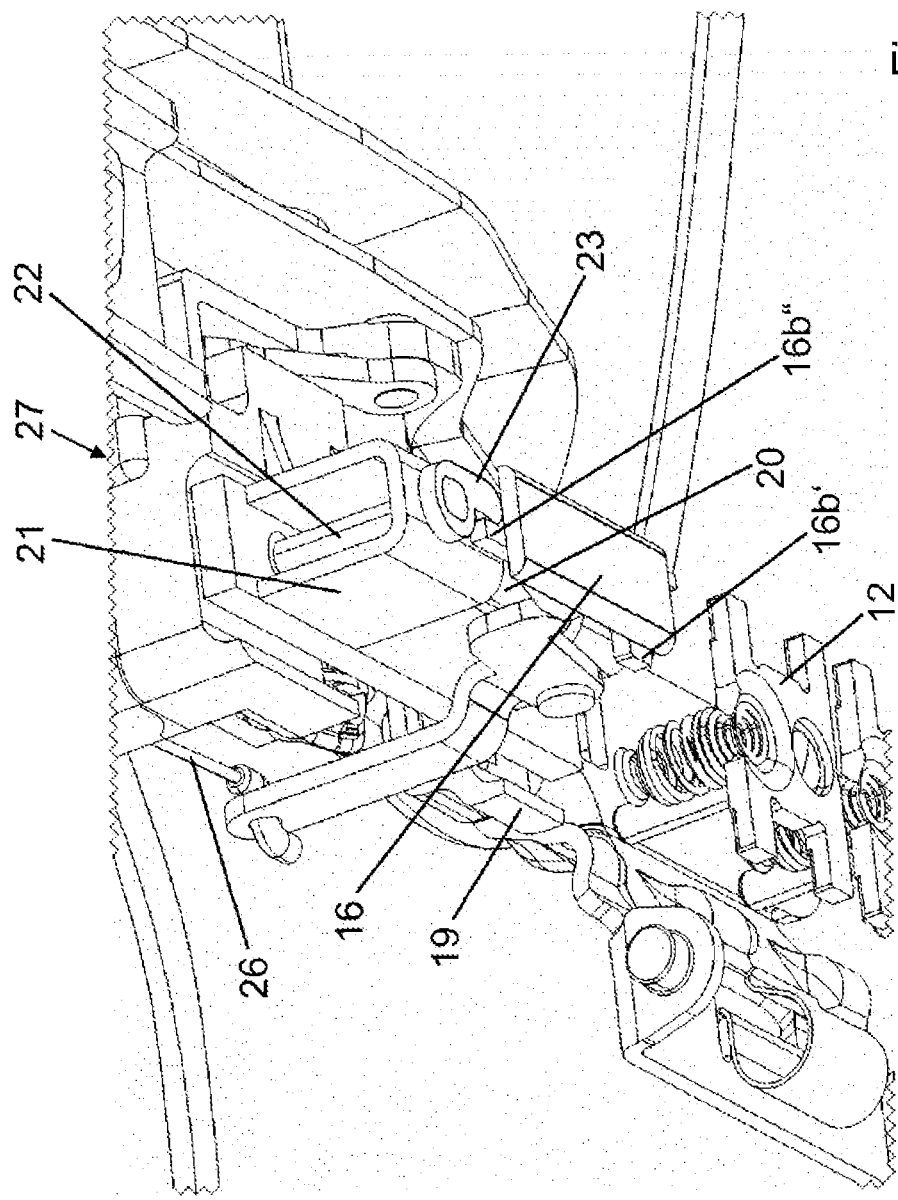
Figure 5:
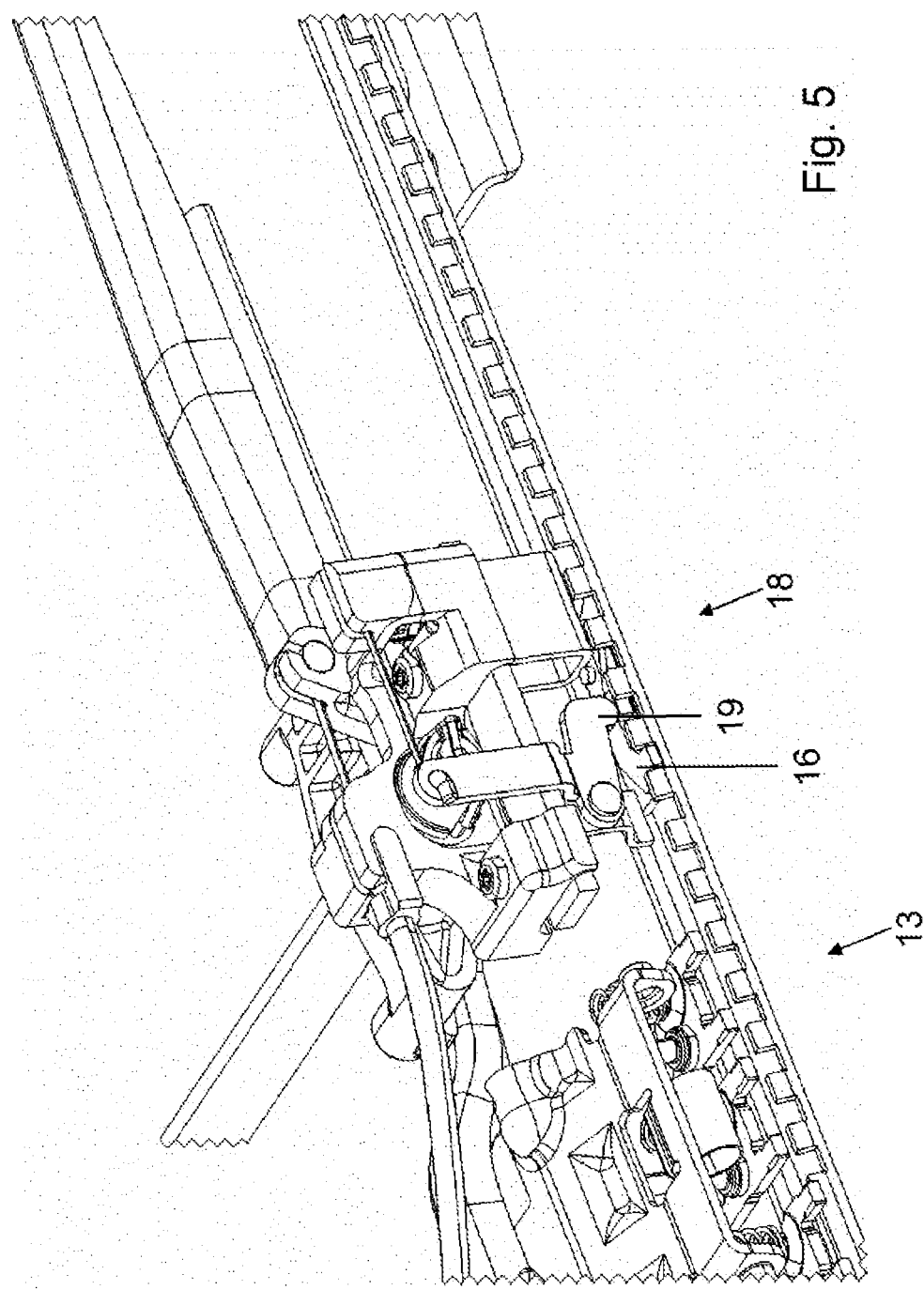
Figure 6:
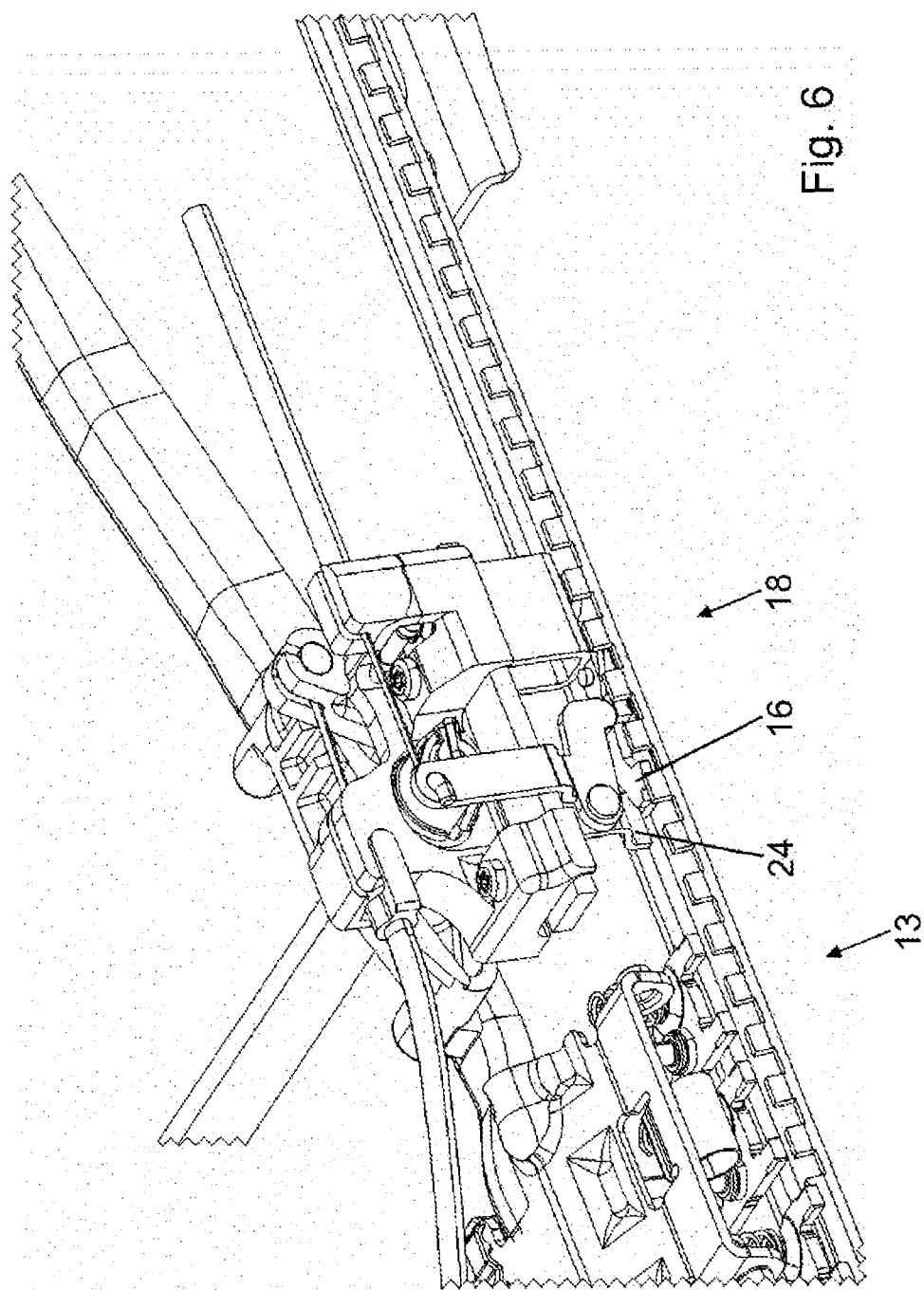
Figure 7:
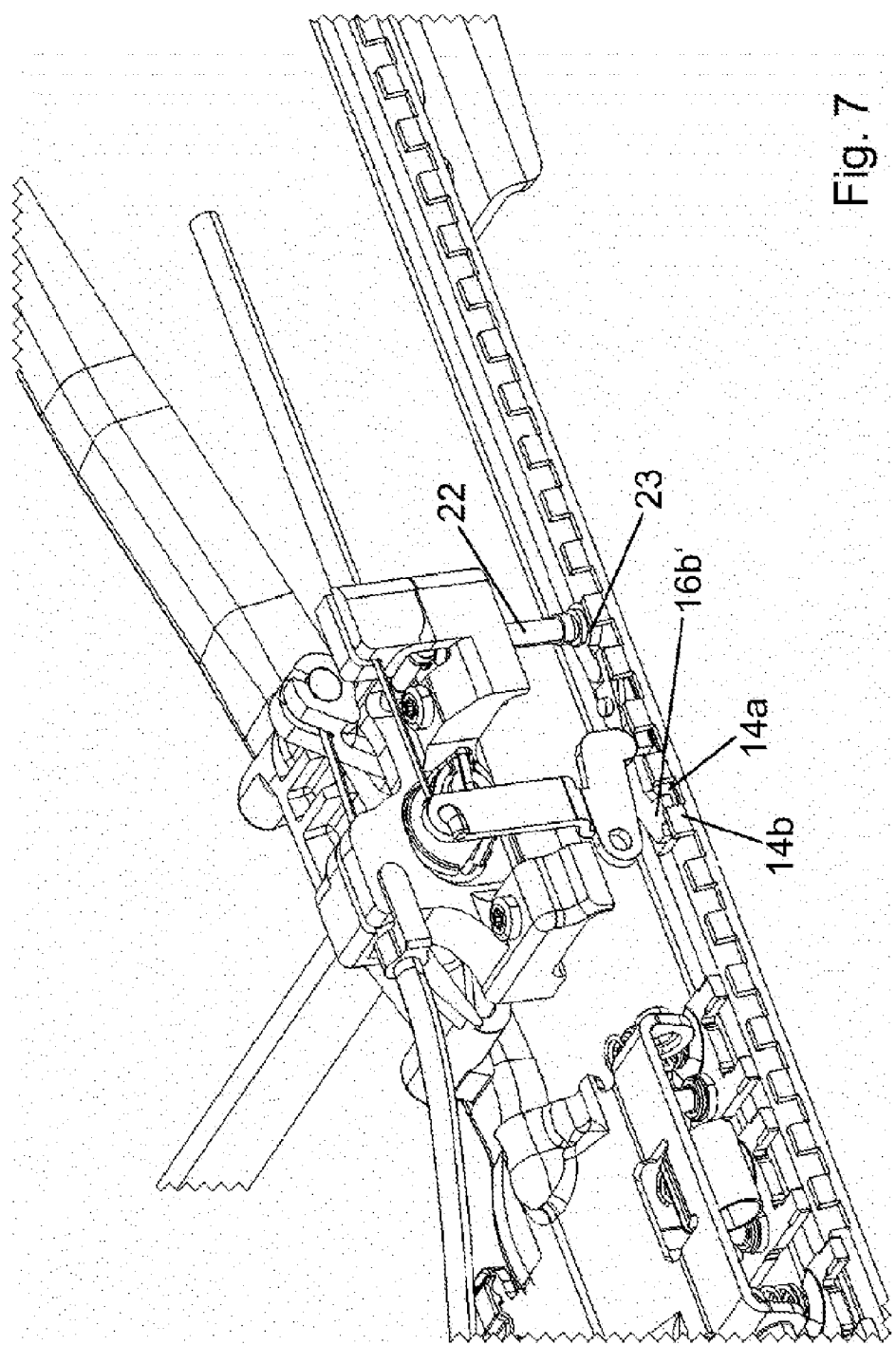
Figure 8:
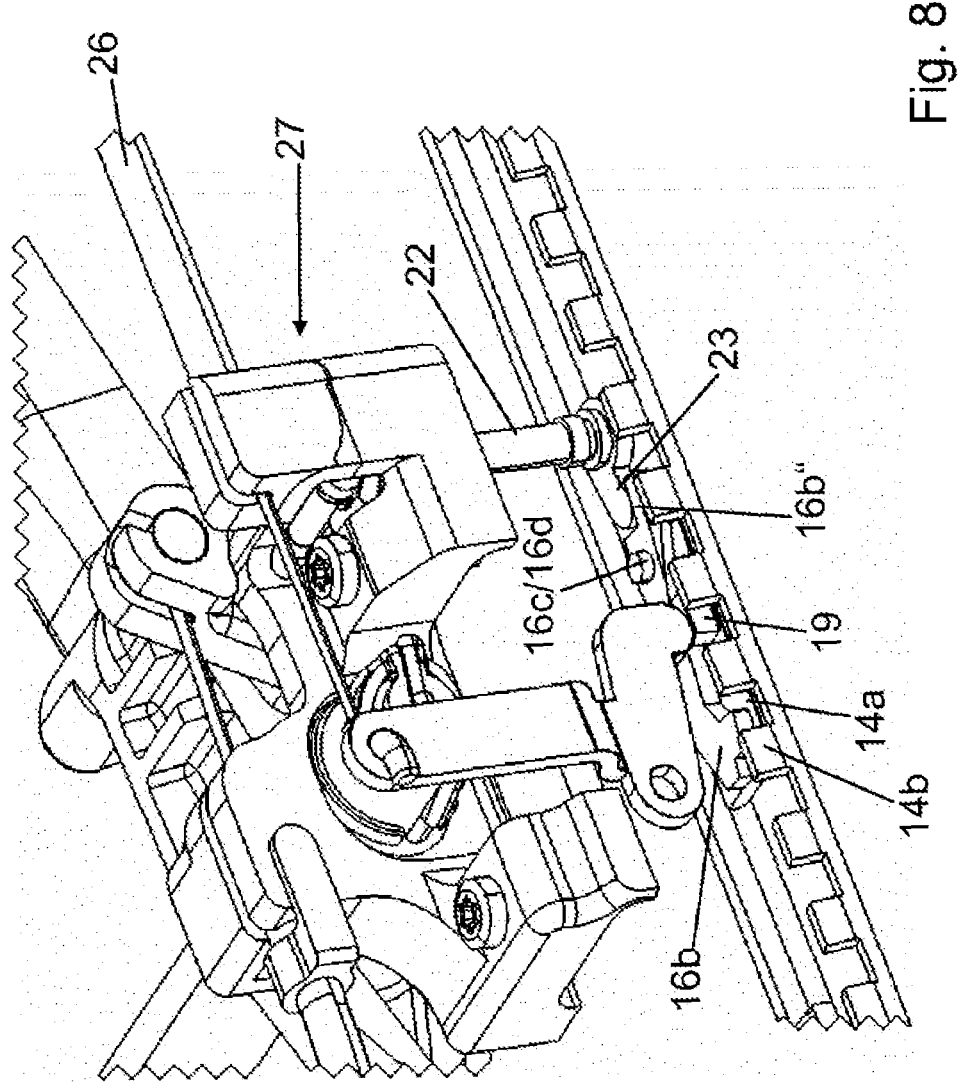
Figure 9:
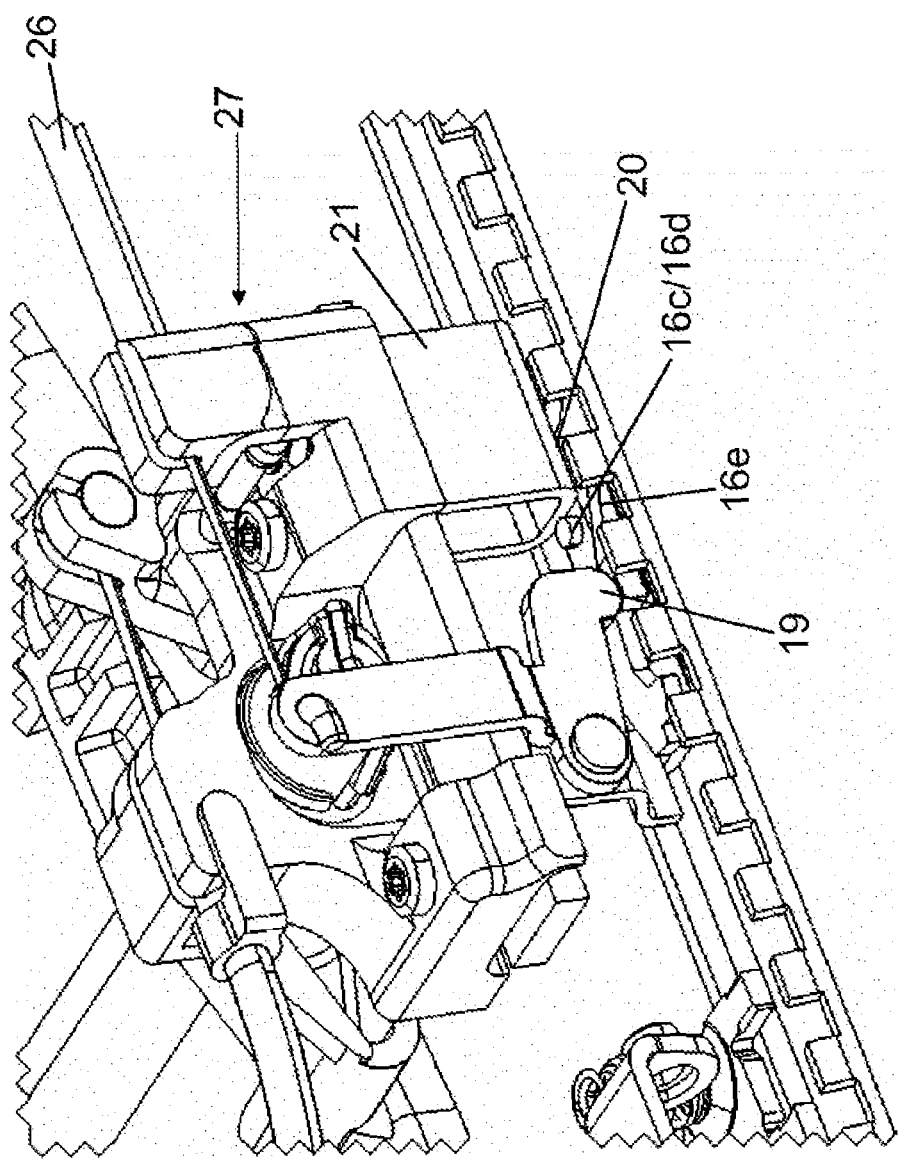
Figure 10:
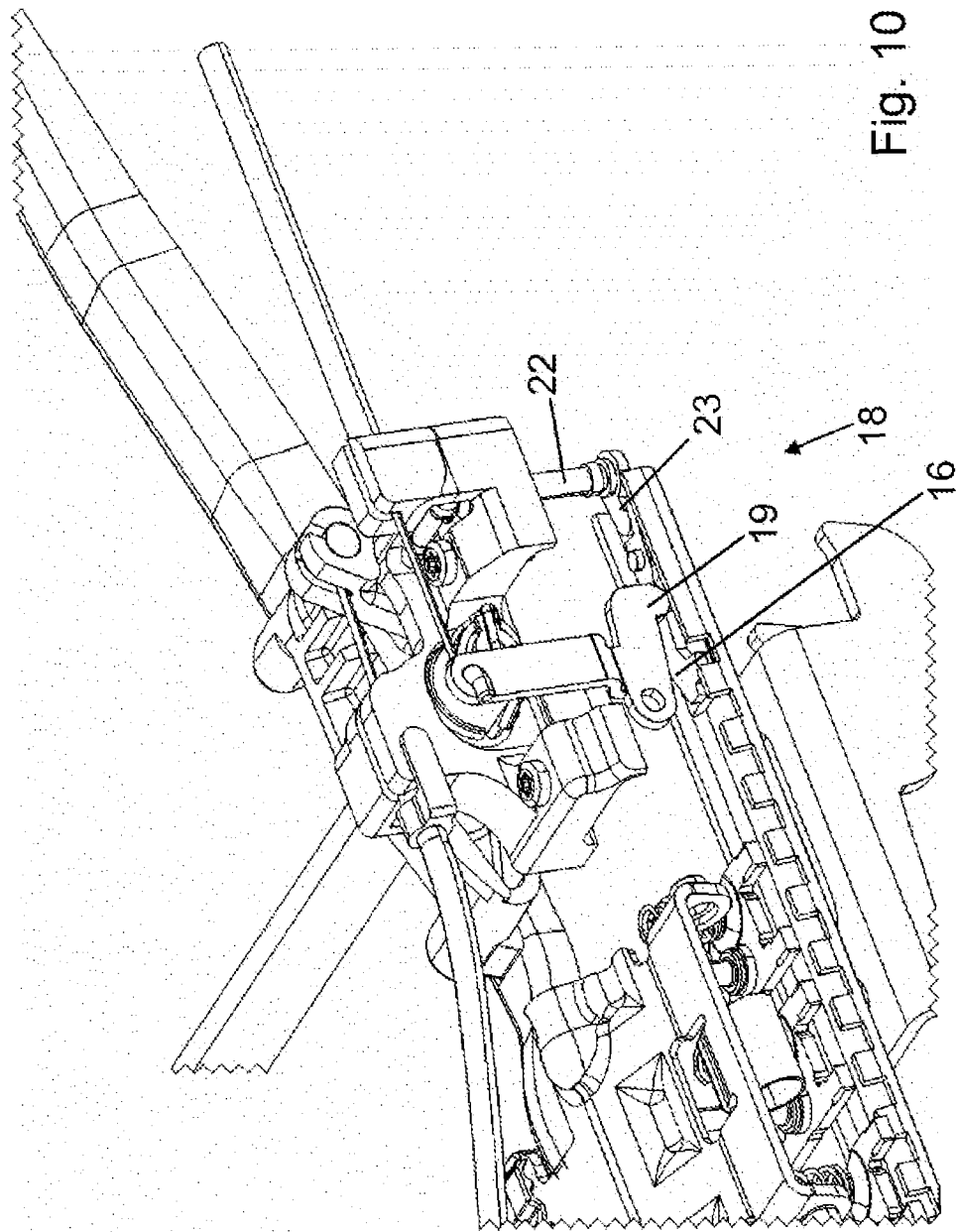
Figure 11:
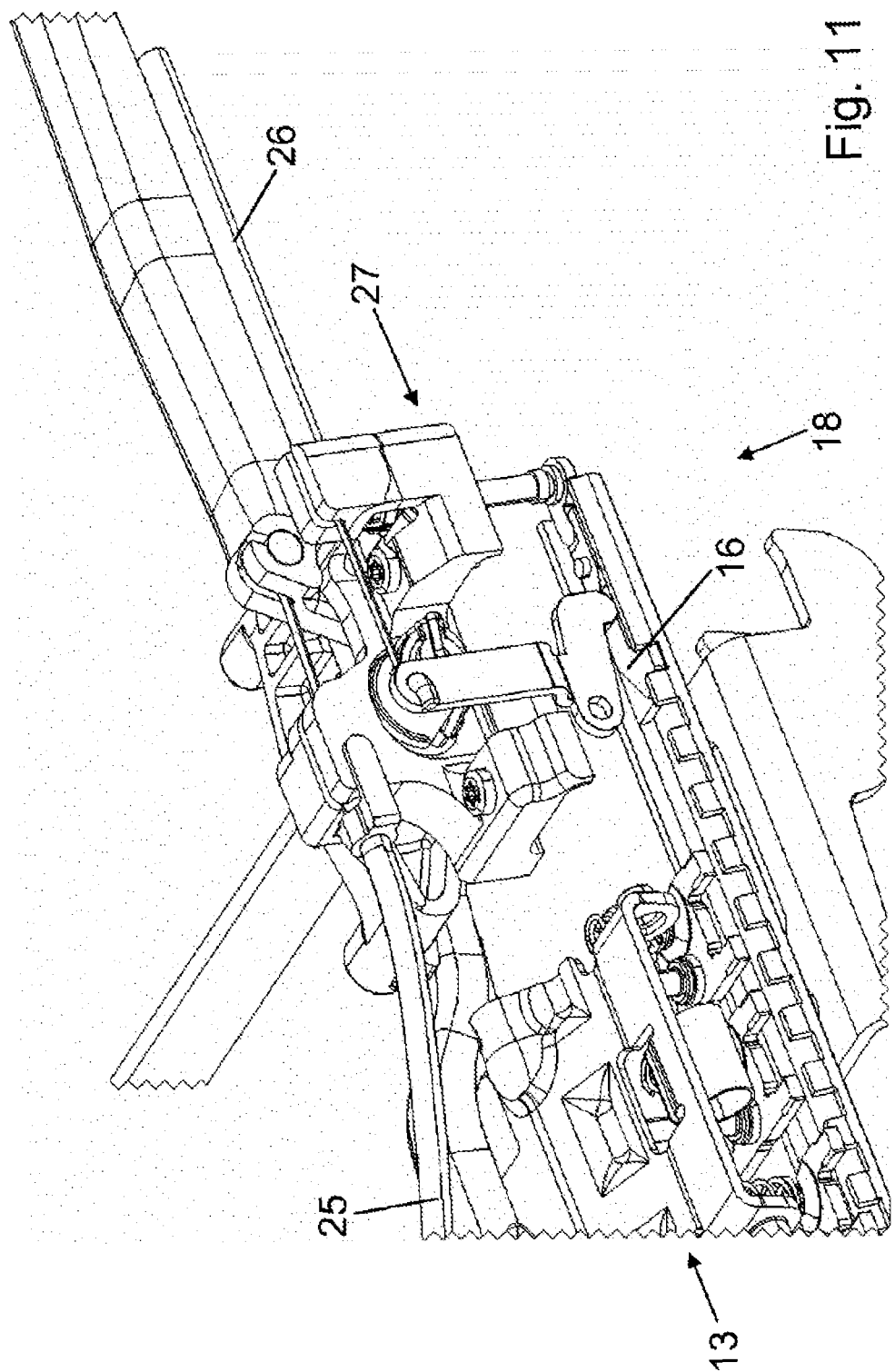
Figure 12:
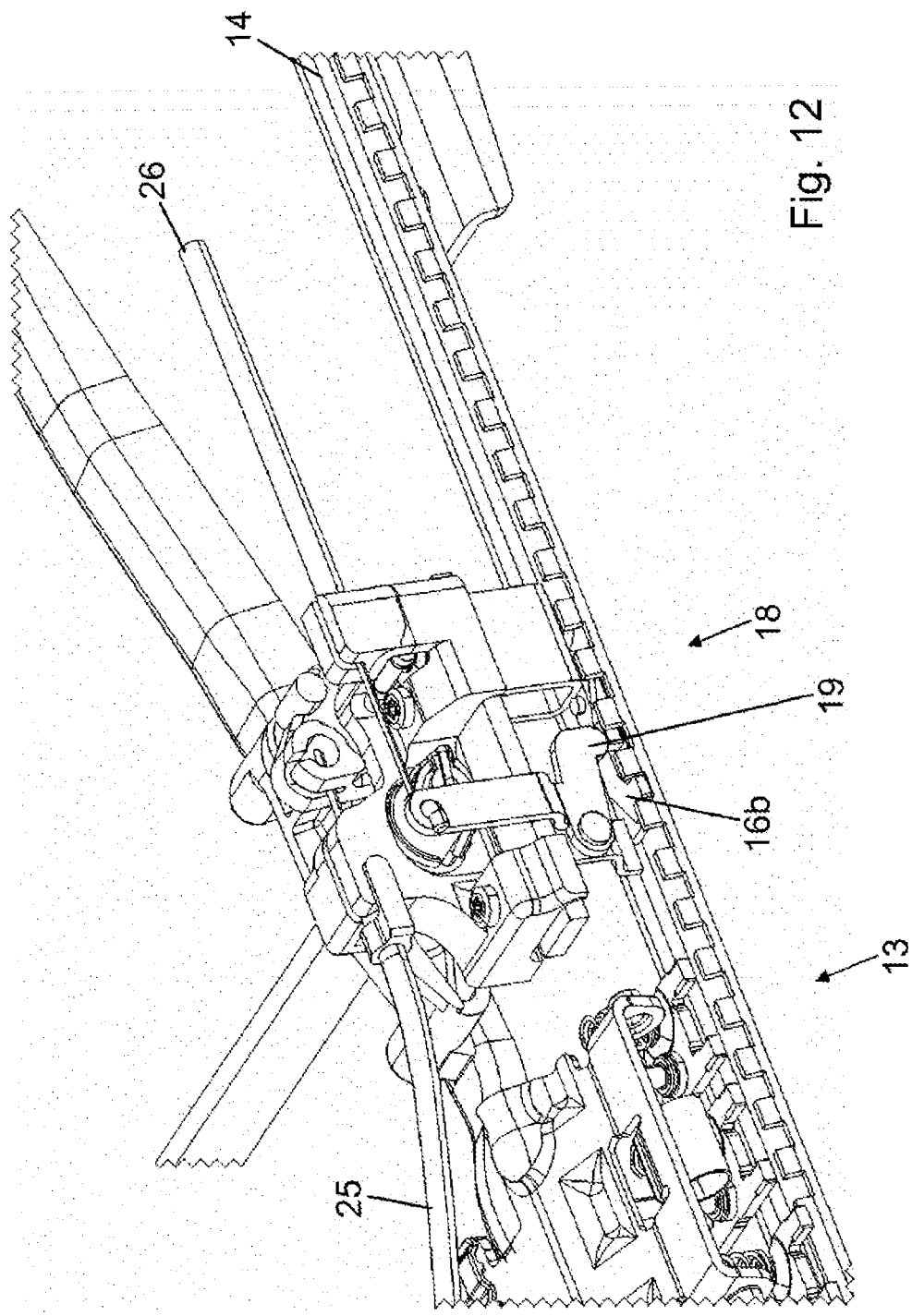
Figure 24:
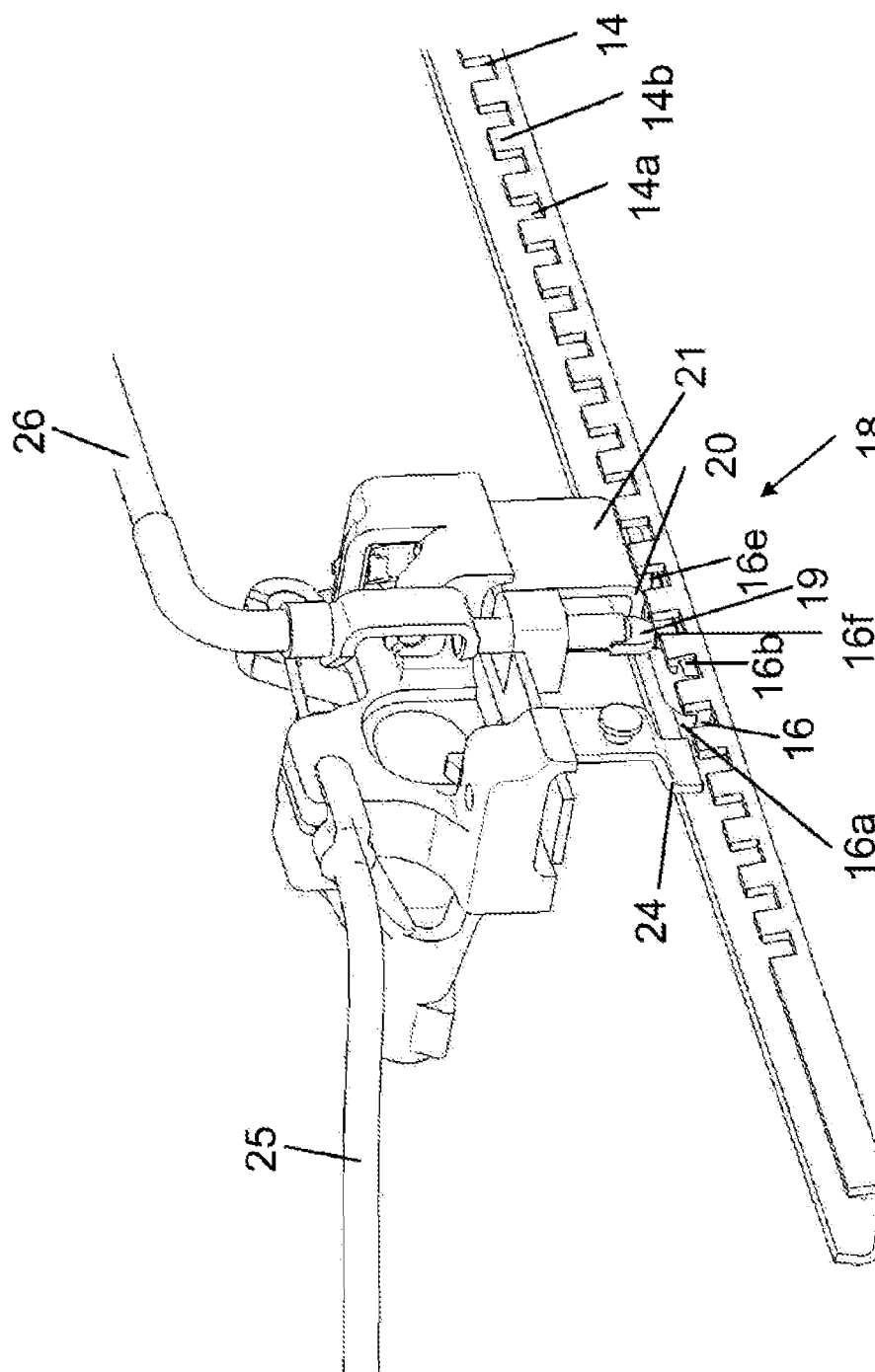
Figure 25:
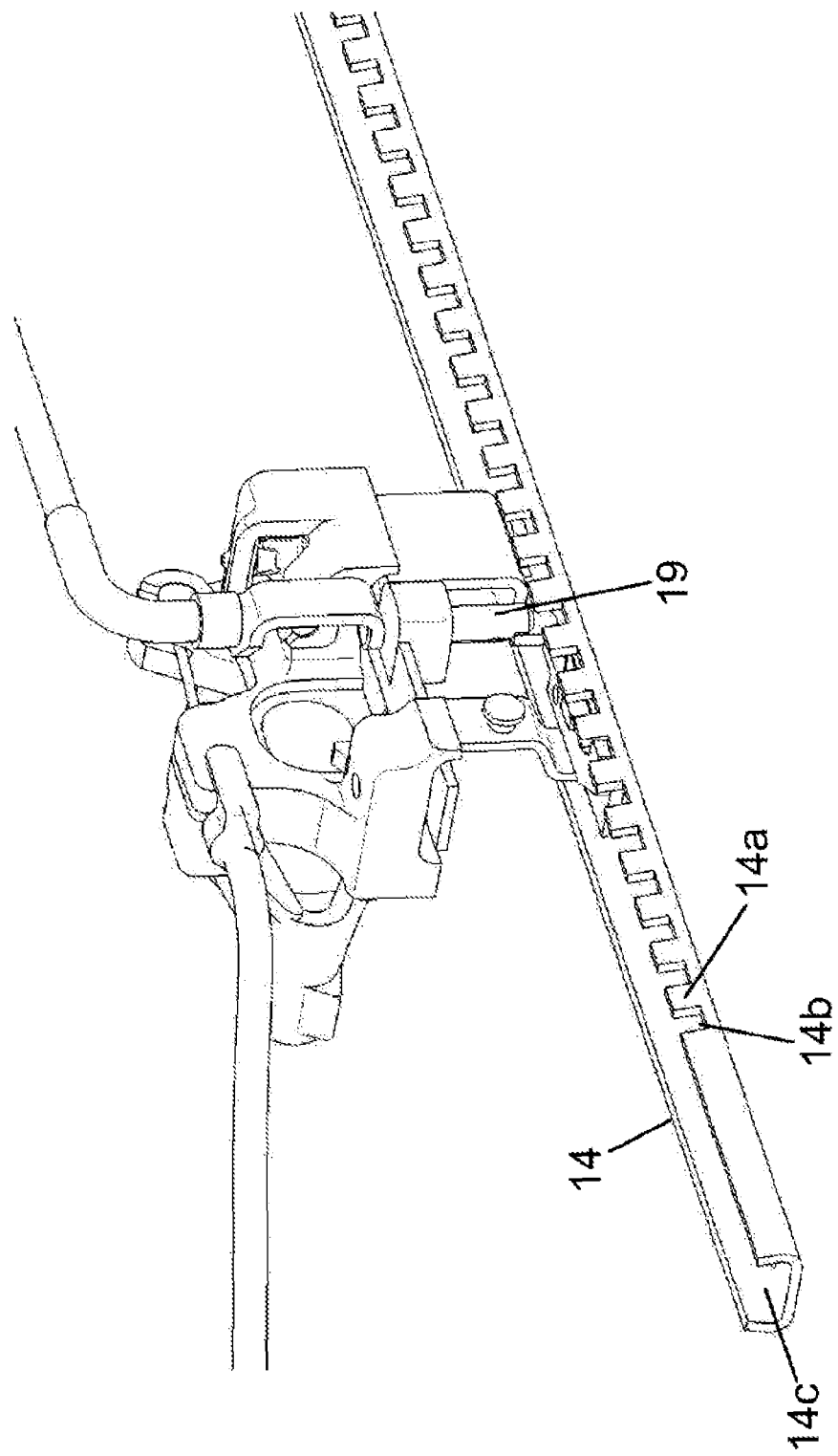
Figure 26:
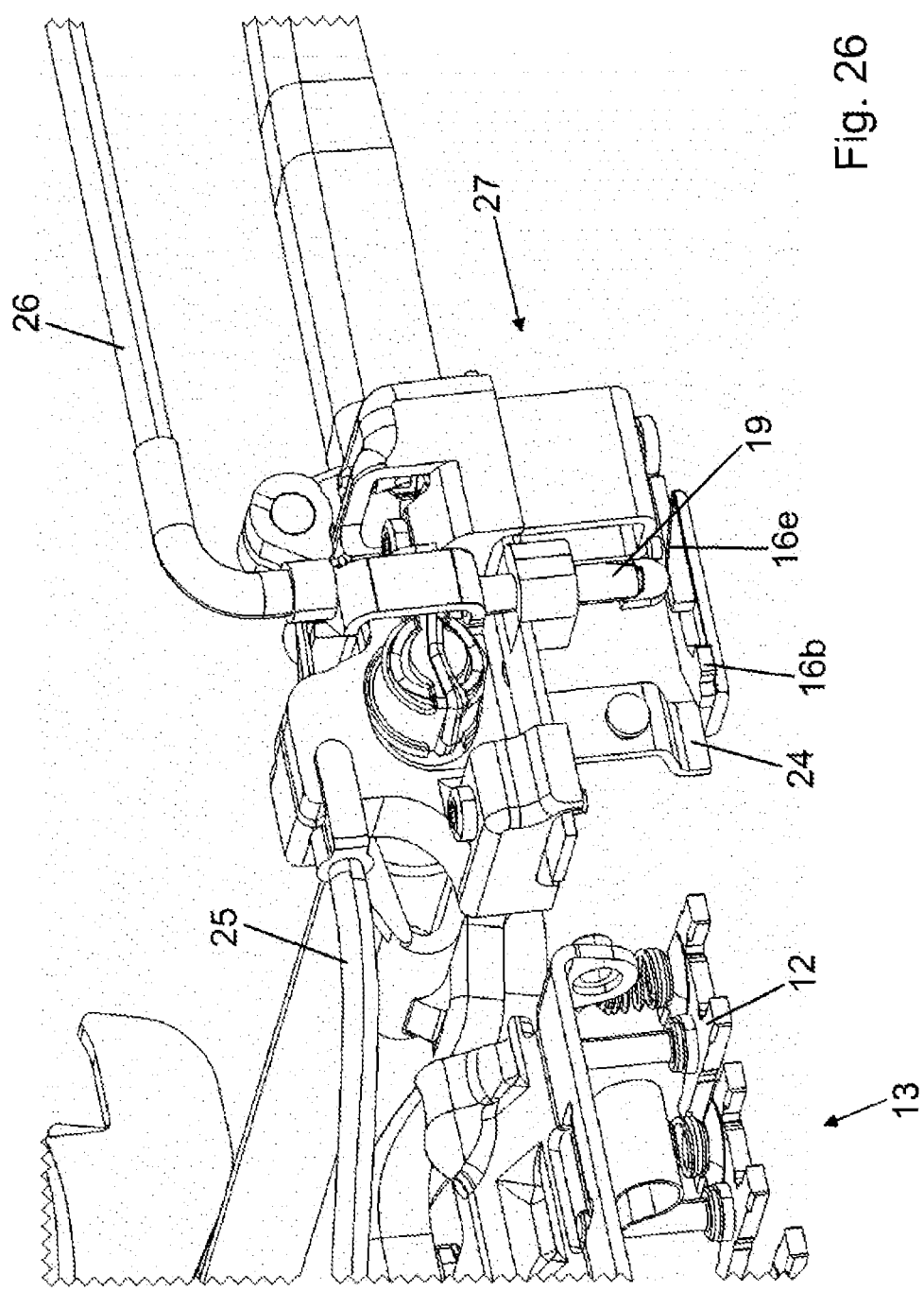
Figure 27:
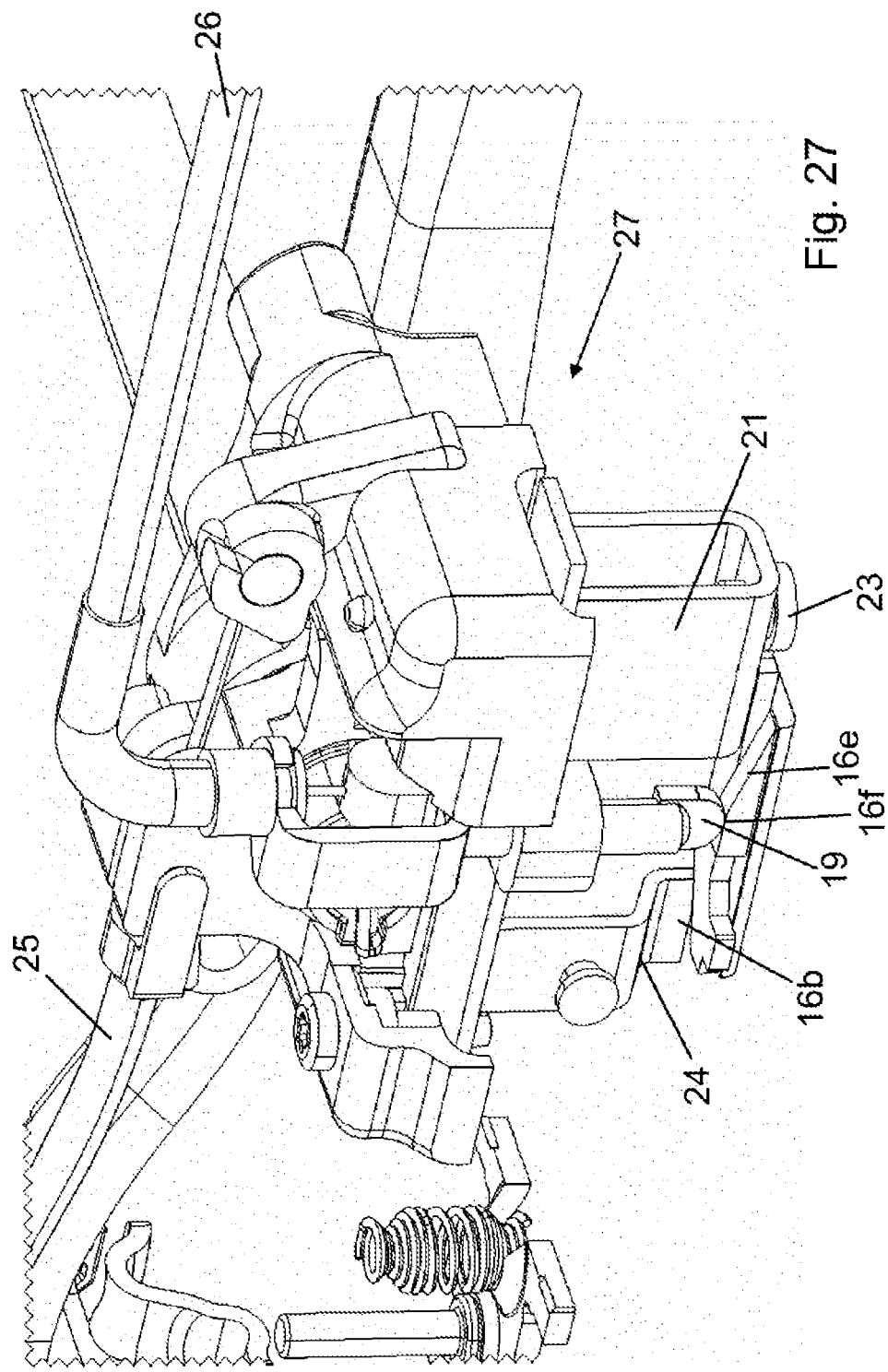

The invention is described in more detail hereinafter with reference to two exemplary embodiments with reference to the drawings, in which:

FIG. 1 shows a perspective detailed view of a longitudinal adjuster with a locking and memory device according to the first exemplary embodiment in the locked position, FIG. 2 shows a view corresponding to FIG. 1 without a view of the seat rails, FIG. 3 shows a perspective view without the stop rail corresponding to FIG. 2, FIG. 4 shows a perspective view of the locking and memory device obliquely from below, FIG. 5 shows a perspective view of the locking and memory device together with the stop rail in the locked position, FIG. 6 shows a perspective view of the locking and memory device together with the stop rail in a position unlocked by the operator on the handle, FIG. 7 shows a view without the housing corresponding to FIG. 6, FIG. 8 shows a detailed view of FIG. 7, FIG. 9 shows a view with the housing corresponding to FIG. 8, FIG. 10 shows a perspective view of the locking and memory device together with the stop rail but without the housing in a front, unlocked position, FIG. 11 shows a perspective view of the locking and memory device together with the stop rail but without the housing in the furthest forward locked position, FIG. 12 shows a perspective view of the locking and memory device together with the stop rail in the unlocked position with the backrest pivoted forward for adopting the entry position, FIG. 13 shows a view without the housing corresponding to FIG. 12, FIG. 14 shows a perspective view of the locking and memory device together with the stop rail in the unlocked position with the backrest pivoted forward for adopting the entry position, when leaving the seat position to be stored, FIG. 15 shows a perspective view of the locking and memory device together with the stop rail in the furthest forward seat position when the seat rail is unlocked, FIG. 16 shows a perspective view of the locking and memory device together with the stop rail in the unlocked position with the backrest pivoted forward for adopting the entry position, shortly before reaching the stored seat position, FIG. 17 shows a perspective view of the locking and memory device together with the stop rail in the locked position after reaching the stored seat position, FIG. 18 shows a view without the housing corresponding to FIG. 17, wherein the locking pawl is shown disengaged, FIG. 19 shows a specific case where the locking pawl is not immediately able to be engaged due to striking a tooth, FIG. 20 shows the engagement of the locking pawl in the next latching opening, FIG. 21 shows a perspective view of the locking element without a pin/stop, FIG. 22 shows a perspective view of the locking pawl of the locking element of FIG. 21, FIG. 23 shows a schematic view of a vehicle seat with a longitudinal adjuster together with the locking and memory device according to the invention, FIG. 24 shows a perspective view of a memory device together with the stop rail according to the second exemplary embodiment in the locked position, FIG. 25 shows a perspective view of the memory device of FIG. 24 together with the stop rail in the unlocked position with the backrest pivoted forward for adopting the entry position after leaving the seat position to be stored, FIG. 26 shows a perspective view of the memory device according to the second exemplary embodiment without the stop rail, FIG. 27 shows a further lateral perspective view of the memory device according to the second exemplary embodiment without the stop rail, and FIG. 28 shows a perspective view obliquely from above of the memory device according to the second exemplary embodiment without the stop rail.

A vehicle seat 1 of a motor vehicle has a longitudinal adjuster 3, by means of which the vehicle seat 1 is able to be longitudinally adjusted, i.e. the longitudinal seat position is able to be adjusted in the longitudinal direction of the seat x (x-direction). The longitudinal direction of the seat x generally extends parallel to the direction of travel. The transverse direction is also denoted hereinafter as the y-direction and the vertical direction as the z-direction.

The manually actuatable longitudinal adjuster 3 has on both vehicle seat sides one respective first seat rail 5 which is connected to the vehicle structure of the motor vehicle, and one respective second seat rail 8 which is displaceable relative to the associated first seat rail 5 in the longitudinal direction of the seat x and able to be locked to said first seat rail 5. In this case, the first seat rail 5 and the second seat rail 8 mutually encompass one another with their substantially U-shaped profiles with longitudinal edges bent inwards and/or outwards, and by the interposition of balls, not shown in more detail. The balls serve both for mutual guidance and reducing the friction between the seat rails 5 and 8. In the present exemplary embodiment, on each vehicle seat side, in each of the four corners of the common seat rail profile of the two metal seat rails 5 and 8, two sets of three balls each are arranged one behind the other at specific intervals in the longitudinal direction of the seat x, wherein the metal balls are held by a total of two ball holders made of plastics material.

For locking the first seat rail 5 and the second seat rail 8, in the present case three latching plates 12 are provided on each vehicle seat side, said latching plates in each case being movably guided in the locking direction z in the second seat rail 8 and being configured for cooperating with the first seat rail 5. With regard to the function of the latching plates 12 in combination with the seat rails 5, 8 as the locking device 13, reference should be made to DE 100 50 959 B4, the relevant disclosure thereof being expressly referred to.

A stop rail 14 is arranged within the first seat rail 5, said stop rail having longitudinal edges bent vertically upwards slightly to the side, one thereof being formed within the normal seating region of the vehicle seat 1 with latching openings 14*a*. The corresponding longitudinal edge is configured in the present case with rectangular teeth, wherein the latching openings 14*a* are formed by the intermediate spaces between two teeth 14*b*, but the latching openings 14*a* may also have any other suitable shape, for example formed by bores, slots or rectangular through-holes. The stop rail 14 has a planar base 14*c* and the two longitudinal edges form guides for a locking element 16 guided displaceably therein in the longitudinal direction of the seat x.

The locking element 16 is formed by a slider 16*a*, a locking pawl 16*b* which is pivotable about a pin 16*c* extending in the z-direction, a stop 16*d* which is formed by a protruding end of the pin 16*c*, and a ramp 16*e* with a horizontally extending upper region 16*f*—forming part of the ramp 16*e*. The ramp 16*e* extends—viewed in the longitudinal direction—approximately from the top of the pin 16*c* to approximately the middle of the distance between the pin and the front end, wherein the obliquely extending region of the ramp 16*e* extends over approximately ⅔ of the total length and the horizontally extending upper region 16*f* of the ramp 16*e* extends over approximately ⅓ of the total length of the ramp 16*e*. The locking pawl 16*b* is configured such that a protruding locking end 16*b*' is able to engage in the latching openings 14*a* when the locking pawl 16*b* is rotated around the pin 16*c* in the closing direction. For rotating the locking pawl 16*b*, a lever arm 16*b*" is formed at the end remote from the locking end 16*b*'. Moreover, an oblique portion 16*b*''' is provided on the rear face of the locking end 16'. In the locked position of the locking pawl 16*b*, one side thereof bears against one side of the ramp 16*e*, wherein in this position the locking end 16*b*' protrudes over the slider 16*a* to the side with a substantially cuboidal region. With this cuboidal region, the locking pawl 16*b* is engaged in its locked position in one of the latching openings 14*a* of the stop rail 14. The locking pawl 16*b* is pretensioned in the direction of the locking position by means of a spring, not shown, i.e. locking takes place automatically when no unlocking force acts on the lever arm 16". This permits a less tensioned arrangement of the spring pretensioning the locking pawl 16b, i.e. a relaxing thereof during the normal use of the vehicle seat 1.

The locking element 16 forms a substantial component of a memory device 18. Different further elements of the memory device 18 cooperate with the locking element 16. Thus a scanner 19 is provided as a further component of the memory device 18, which cooperates with the ramp 16e and the upper region 16f thereof and determines the presence of the locking element 16. Moreover, a memory stop 20 is provided as a further component of the memory device 18, which cooperates with the stop 16d, formed by the end of the pin 16c. The memory stop 20 is formed by one end of a U-shaped housing 21 arranged to the rear in the longitudinal direction of the rail, through which a rotatable shaft 22 extends, on the lower end thereof an actuating lever 23 being arranged which is a further component of the memory device 18 and is able to cooperate with the lever arm 16b" of the locking pawl 16b, in order to bring the locking pawl 16b out of engagement. The memory stop 20 also serves to entrain the locking element 16 when the locking pawl 16b is unlocked in the case of a longitudinal adjustment of the vehicle seat 1 counter to the direction of travel. A drive element 24, which in the present case is arranged adjacent to the scanner 19, entrains the locking element 16 when the locking pawl 16b is unlocked in the case of a longitudinal adjustment of the vehicle seat 1 in the direction of travel, wherein in the case of a longitudinal displacement of the vehicle seat when the locking element 16 is unlocked, the drive element 24 comes into abutment in the vicinity of the locking end 16b', in the present case in the region of the oblique portion 16b" of the locking pawl 16b.

Moreover, two transmission arrangements 25, 26 are provided, both of said transmission arrangements being formed in the present case by Bowden cables. The first transmission arrangement 25 provides a direct transmission of a pivoting movement of the backrest of the vehicle seat 1 to the latching plates 12, i.e. the locking device 13 is unlocked by an actuation thereof. The second transmission arrangement 26 provides a transmission of a movement of the scanner 19 to a locking device on the backrest adjuster, not shown in more detail, in order to unlock the backrest adjuster which is locked in the entry position, i.e. in this case it is signaled with a movement of the scanner 19 that after adopting the entry position the vehicle seat 1 is again in its initial position so that the backrest locking device is unlocked and the backrest is able to be folded back again into the normal (initial) position.

The function of the memory device 18 during a normal longitudinal adjustment movement of the vehicle seat 1 is described in more detail hereinafter with reference to FIGS. 5 to 11.

In the initial position shown in FIG. 5, at least one of the latching plates 12 of the locking device 13 fixed to the upper rail is in engagement in corresponding latches of the lower first seat rail 5 and the locking element 16 of the memory device 18 is located in its locked position, i.e. the locking end 16b' of the locking pawl 16b engages in a latching opening 14a of the stop rail 14 and secures the locking element 16 against a displacement in the longitudinal direction of the seat inside the stop rail 14.

If the vehicle seat 1 is to be displaced for adjusting its longitudinal position, and whilst maintaining the upright position of the backrest, in a first step a handle A which is generally arranged on the front end of the vehicle seat is actuated, whereby the locking device 13 is unlocked, i.e. the latching plates 12 come out of engagement as long as the handle A is actuated and a corresponding force is exerted by the user. Due to the actuation of the handle A, via a third transmission arrangement 27 a rotation takes place of the shaft 22 and thus of the actuating lever 23 which with its rotational movement entrains the lever arm 16b" and as a result brings the locking pawl 16b of the locking element 16 out of engagement with the latching opening 14a, so that the locking element 16 is no longer locked as shown in FIGS. 6 to 9.

The vehicle seat 1 in the present case is displaced to the front into its furthest forward position (see FIGS. 10 and 11), wherein the locking element 16 is entrained by the drive element 24. In this case, the locking pawl 16b maintains its unlocked position as the actuating lever 23 is continually pressed onto the lever arm 16b". If the handle A is released in the desired seat position, the locking device 13 is locked again, i.e. the vehicle seat 1 is no longer able to be altered in its longitudinal position. At the same time, the actuating lever 23 rotates back into its initial position and as a result releases the locking pawl 16b of the locking element 16, which due to the spring pretensioning presses against the next tooth 14b of the stop rail 14 (position of FIG. 10) or falls directly into a latching opening 14a (position of FIG. 11) and as a result stores the vehicle seat position. If the locking pawl 16b comes to bear against a tooth 14b of the stop rail 14, due to the spring pretensioning it falls into the next latching opening 14a in the direction of movement and thus said vehicle seat position, which approximately corresponds to the originally locked vehicle seat position, is stored as soon as the locking element 16 is locked due to a vehicle seat displacement without actuating the handle A.

If the vehicle seat 1 is displaced to the rear, the housing 21 takes over the drive function with its memory stop 20, which bears against the stop 16d formed by the pin 16c. In other respects the function corresponds to that described above.

With reference to FIGS. 12 to 20, the function of the memory device 18 is described hereinafter in the case of adopting an entry position, i.e. folding the backrest forward when actuating a lever B arranged on the outside of the backrest (see FIG. 23) in combination with unlocking the locking device 13 and moving the vehicle seat 1 forward into the furthest forward position.

In the initial position shown in FIG. 12, at least one of the latching plates fixed to the upper rail 12 of the locking device 13 is in engagement in corresponding latches of the lower first seat rail 5 and the locking element 16 of the memory device 18 is located in its locked position, i.e. the locking end 16b' of the locking pawl 16b engages in a latching opening 14a of the stop rail 14 and secures the locking element 16 against a displacement in the longitudinal direction of the seat inside the stop rail 14. If the backrest is folded forward, the locking device 13 is released, triggered by the forward folding movement of the backrest.

If the vehicle seat 1 moves forward, the scanner 19 slides downwards from the horizontal upper region 16f over the ramp 16e which in the present case is at an angle to the seat rail 5 of less than 45°, and leaves the locking element 16. Moreover, the memory stop 20 comes out of contact with the stop 16d of the locking element 16. The drive element 24 slides to the side past the locking element 16, without driving said locking element. The sliding-off movement is associated with a slight pivoting movement of the scanner 19, which is forwarded to the second transmission arrangement 26. Due to the arrangement of the pivot axis of the scanner 19 and the embodiment of the scanning arm and the arm connected to the core of the Bowden cable of the second transmission arrangement 26, in the present case a transmission results at the ratio 2:1, wherein the movement of the core end is approximately double the size of the height of the ramp 16e scanned by the scanner 19. The sheath of the Bowden cable of the second transmission arrangement 26 is supported on a part of the housing 21 fixed to the upper rail. By the actuation of the second transmission arrangement 26 a so-called comfort locking of the backrest takes place in the folded-forward position, whereby the vehicle seat 1 is able to be more easily pushed forward and back.

The locking of the backrest in the folded-forward position is only released just before reaching the memory position again, namely when the scanner 19 slides up the ramp 16e and as a result is pulled at the core end of the second transmission arrangement 26. When the memory position is reached, the scanner 19 has already reached the maximum height of the ramp 16e, i.e. the upper region 16f, so that the comfort locking of the backrest in this position is already released. Shortly after the scanner 19 has reached the maximum height of the ramp 16e the memory stop 20 on the housing 21 comes into contact with the stop 16d formed by the protruding pin 16c of the locking element 16 which stops the movement of the vehicle seat 1 to the rear. The locking device 13 is locked after folding back the backrest.

If the locking element 16 is in a non-engaged position as an initial position, i.e. the locking pawl 16b bears by means of spring pretensioning against a tooth 14b (see FIG. 19), the locking element 16 is entrained by the drive element 24 as far as the next latching opening 14a, and due to the spring pretensioning of the locking pawl 16b and the released lever arm 16b", engages with the locking end 16b' in said latching opening 14a, whereby the locking element 16 is locked in this position (FIG. 20) and remains there during the further displacement of the vehicle seat 1 to the front. The further movement of the vehicle seat 1 into the entry position takes place as described above. However, the position is adopted as a memory position by the vehicle seat 1 in which the locking pawl 16b has been locked, i.e. a position slightly offset to the front relative to the original vehicle seat position.

The second exemplary embodiment is described hereinafter in more detail with reference to FIGS. 24 to 28. In this case, the second exemplary embodiment differs from the first exemplary embodiment exclusively by the design of the second transmission arrangement 26 and the shape of the scanner 19 so that—unless expressly mentioned hereinafter—reference is made to the description of the first exemplary embodiment, even regarding the function. Moreover, for clearer understanding of the same elements or elements with the same function, the same reference numerals are used as in the first exemplary embodiment.

The essential difference from the first exemplary embodiment is that the second transmission arrangement 26 has a direct 1:1 transmitting scanner 19 which transmits a thrust movement (in contrast to the traction movement of the core of the Bowden cable according to the pivotably arranged lever arms of the first exemplary embodiment), which is used for locking the backrest. The scanner 19 presses downwards due to a corresponding preloading and in the case of a longitudinal displacement of the vehicle seat 1 is displaced from the upper region 16f downwards along the ramp 16e, i.e. the lifting of the scanner 19 (and thus the transmitted adjusting movement) corresponds to the height of the ramp 16e.

According to the exemplary embodiments shown in the drawings, the upper horizontal region 16f of the ramp 16e protrudes slightly beyond the locking pawl 16b, in the present case by approximately 50% of the thickness of the locking pawl 16b.

LIST OF REFERENCE NUMERALS

1 Vehicle seat
3 Longitudinal adjuster
5 First seat rail
8 Second seat rail
12 Latching plate
13 Locking device
14 Stop rail
14a Latching opening
14b Tooth
14c Base
16 Locking element
16a Slider
16b Locking pawl
16b' Locking end
16b" Lever arm
16b''' Oblique portion
16c Pin
16d Stop
16e Ramp
16f Upper region
18 Memory device
19 Scanner
20 Memory stop
21 Housing
22 Shaft
23 Actuating lever
24 Drive element
25 First transmission arrangement
26 Second transmission arrangement
27 Third transmission arrangement
A Handle (longitudinal adjuster)
B Lever (backrest unlocking device)
x x-direction, longitudinal direction of the seat
y y-direction, transverse direction
z z-direction, locking direction

The invention claimed is:
1. A longitudinally adjustable vehicle seat comprising:
a freely pivotable backrest which is able to be folded forward;
a memory device;
at least one first seat rail configured to be fixed to a vehicle structure;
a second seat rail guided in said first seat rail and connected to a portion of the vehicle seat; and
a longitudinal adjuster with a releasable locking device for locking the two seat rails,
wherein the vehicle seat is able to adopt an entry position by folding forward the backrest and unlocking the locking device,
wherein said memory device is configured to store the position of the second seat rail fixed to the vehicle seat relative to the first seat rail fixed to the vehicle structure,
the memory device having a stop rail with latching openings and a locking element with a slider and a locking pawl pivotably connected to the slider,
wherein a transmission arrangement is provided which cooperates with a comfort locking device of the backrest of the vehicle seat in an entry position,
wherein the slider has a ramp with an upper region with which a scanner of the memory device cooperates,
wherein the scanner is connected to the transmission arrangement,
wherein the locking pawl is pretensioned in the locking direction with a spring, wherein the locking pawl is pivotably attached to the slider such that the locking pawl is pivotable about a vertical pivot axis relative to the slider and, for storing the memory position, cooperates with latching openings laterally arranged on the stop rail, wherein the locking element has a stop protruding in the vertical direction, wherein the stop extends along the vertical pivot axis of the locking pawl.

2. The vehicle seat as claimed in claim 1, wherein the ramp is at an angle relative to the first seat rail of less than 45°, in particular a maximum of 30°, and the upper region of the ramp extends parallel to the first seat rail.

3. The vehicle seat as claimed in claim 1, wherein folding forward the backrest and locking the backrest in the folded-forward position unlocks the locking device, after a forward displacement movement of the vehicle seat.

4. The vehicle seat as claimed in claim 3, wherein the backrest is locked in the folded-forward position whilst at least one of the scanner slides down over the ramp and/or when the scanner is leaving the ramp.

5. The vehicle seat as claimed in claim 3, wherein the unlocking of the backrest takes place in the folded-forward position after the scanner has reached the ramp and whilst at least one of the scanner slides up along the ramp and/or when the scanner has reached the upper region of the ramp.

6. The vehicle seat as claimed in claim 1, wherein the locking element is unlocked while the vehicle seat is being longitudinally adjusted and is entrained by stops, wherein the scanner remains in abutment against the upper region of the ramp while the vehicle seat is being longitudinally adjusted.

7. The vehicle seat as claimed in claim 1, wherein the scanner provides a direct 1:1 transmission of pressure to the locking device of the backrest in the entry position.

* * * * *